United States Patent
Aoki

[11] Patent Number: 6,141,156
[45] Date of Patent: Oct. 31, 2000

[54] ANTIVIBRATION ZOOM LENS

[75] Inventor: Masayuki Aoki, Oyama, Japan

[73] Assignee: Nikon Corporation, Tokyo, Japan

[21] Appl. No.: 09/265,473

[22] Filed: Mar. 10, 1999

[30] Foreign Application Priority Data

Mar. 12, 1998 [JP] Japan ................... 10-061764

[51] Int. Cl.⁷ ............................. G02B 15/14
[52] U.S. Cl. .................. 359/686; 359/687; 359/554; 359/557
[58] Field of Search ................... 359/557, 554, 359/687, 686

[56] References Cited

U.S. PATENT DOCUMENTS

| | | | |
|---|---|---|---|
| 5,040,881 | 8/1991 | Tsuji | 359/557 |
| 5,270,857 | 12/1993 | Oizumi et al. | 359/554 |
| 5,502,594 | 3/1996 | Suzuki et al. | 359/557 |
| 5,654,826 | 8/1997 | Suzuki | 359/557 |
| 5,748,383 | 5/1998 | Ohtake | 359/683 |
| 5,798,871 | 8/1998 | Shibayama et al. | 359/684 |
| 5,963,378 | 10/1999 | Tochigi et al. | 359/687 |

FOREIGN PATENT DOCUMENTS

| | | | |
|---|---|---|---|
| 6419112 | 1/1989 | Japan | F01P 3/20 |
| 6419113 | 1/1989 | Japan | F01P 3/20 |
| 1130330 | 5/1989 | Japan | G11B 7/09 |
| 1189621 | 7/1989 | Japan | G02B 15/16 |
| 1284823 | 11/1989 | Japan | G02B 27/64 |

*Primary Examiner*—Georgia Epps
*Assistant Examiner*—Tim Thompson
*Attorney, Agent, or Firm*—Vorys, Sater, Seymour and Pease, LLP

[57] ABSTRACT

An antivibration zoom lens (10) for photography, video and the like. The zoom lens has an antivibration function and is capable of forming an image of an object over a zooming range from a maximum wide-angle state to a maximum telephoto state. The zoom lens comprises, objectwise to imagewise along an optical axis (A), a first lens group (G1) having a focal length f1 and positive refractive power. A second lens group (G2) is arranged adjacent the first lens group and serves as the antivibration lens group. The second lens group has a focal length f2, negative refractive power and comprises at least three lens sub-groups (G2A–G2C). One of the at least three lens sub-groups has a focal length t2B and is movable substantially perpendicularly to the optical axis. The zoom lens further comprises at least a third lens group (G3) and fourth lens group (G4). All the lens groups are separated by respective spacings which change when zooming from the maximum wide-angle state to the maximum telephoto state. In addition, the zoom lens preferably satisfies at least one of a number of design conditions.

6 Claims, 25 Drawing Sheets

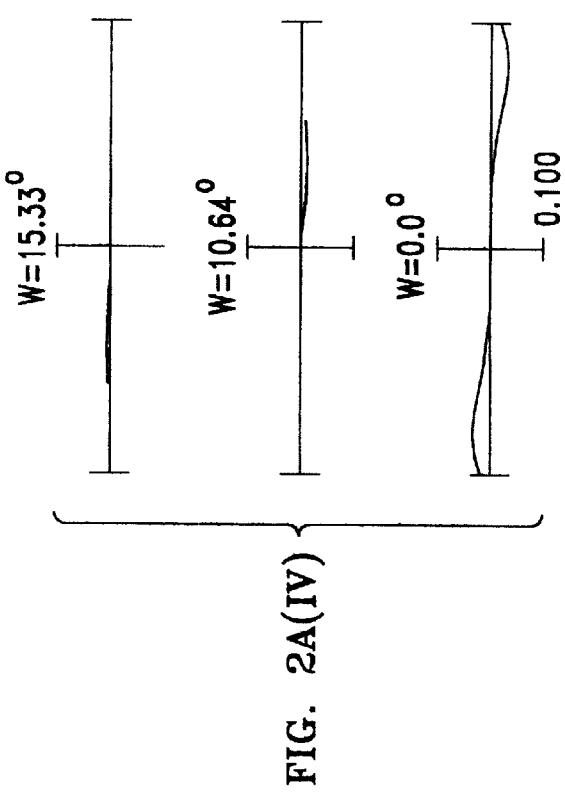
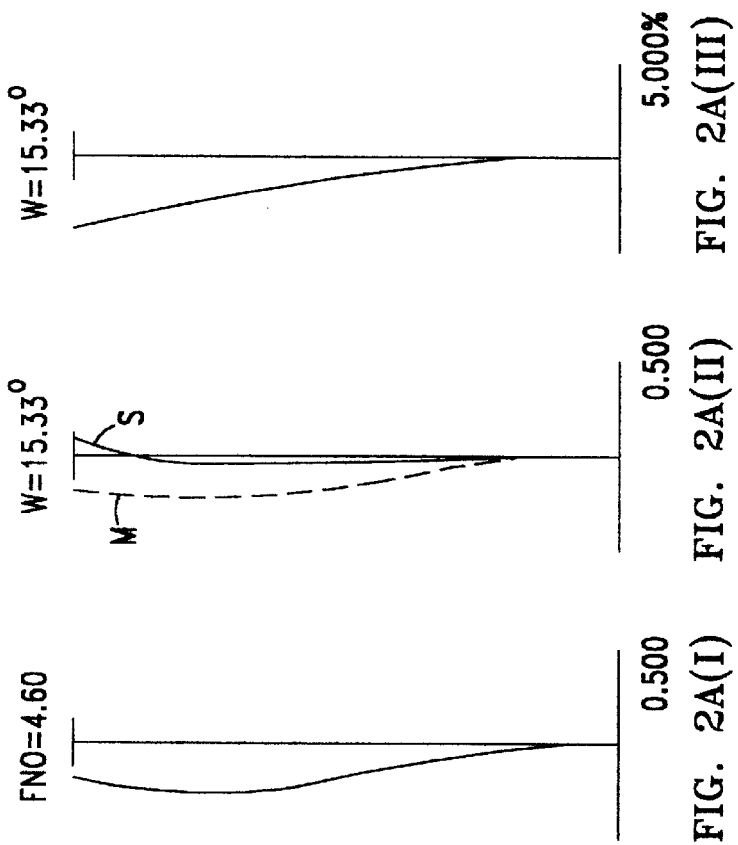
FIG. 2A(I)   FIG. 2A(II)   FIG. 2A(III)   FIG. 2A(IV)

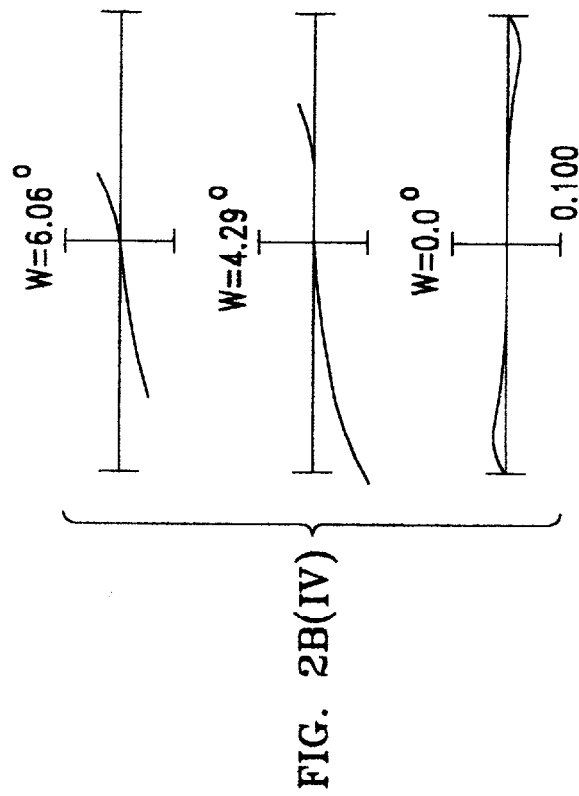
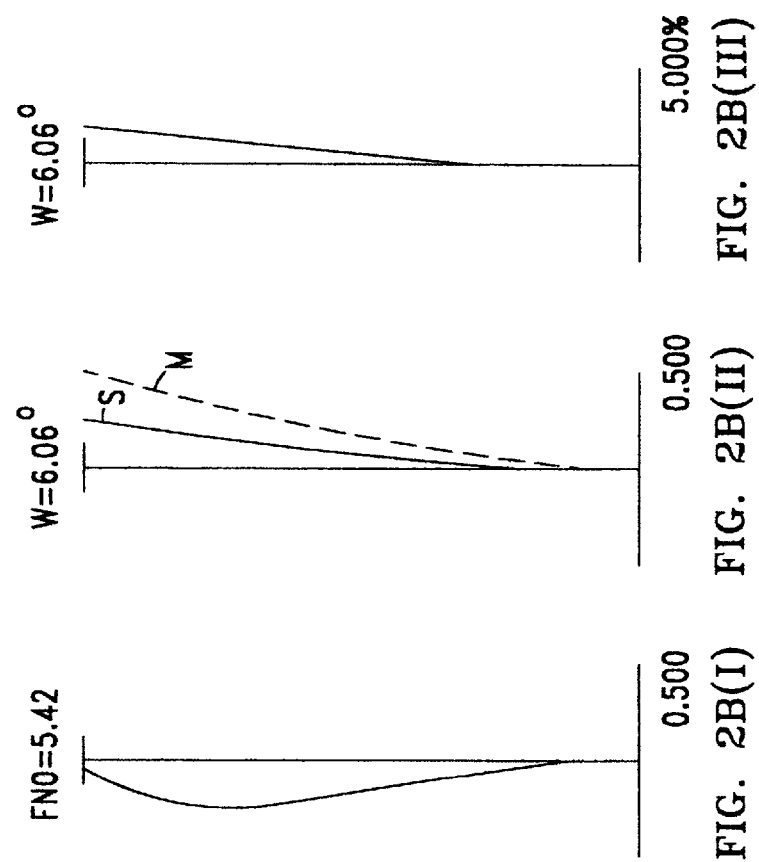

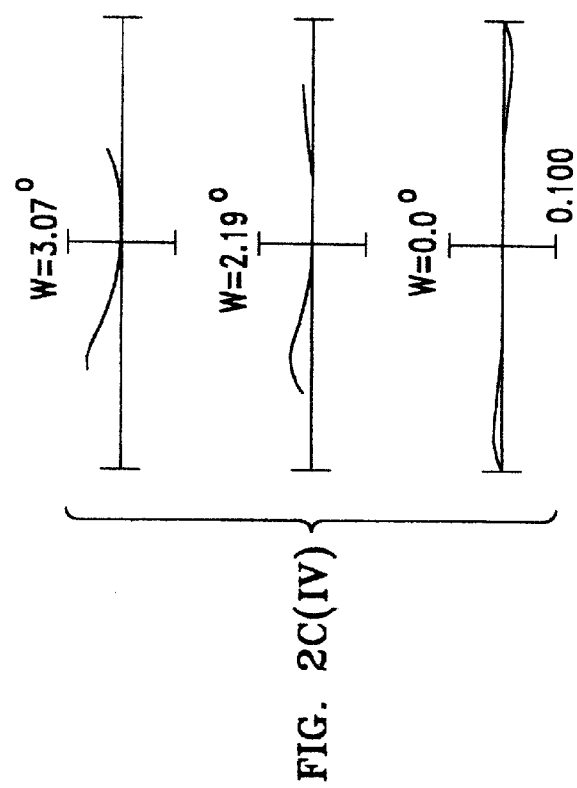
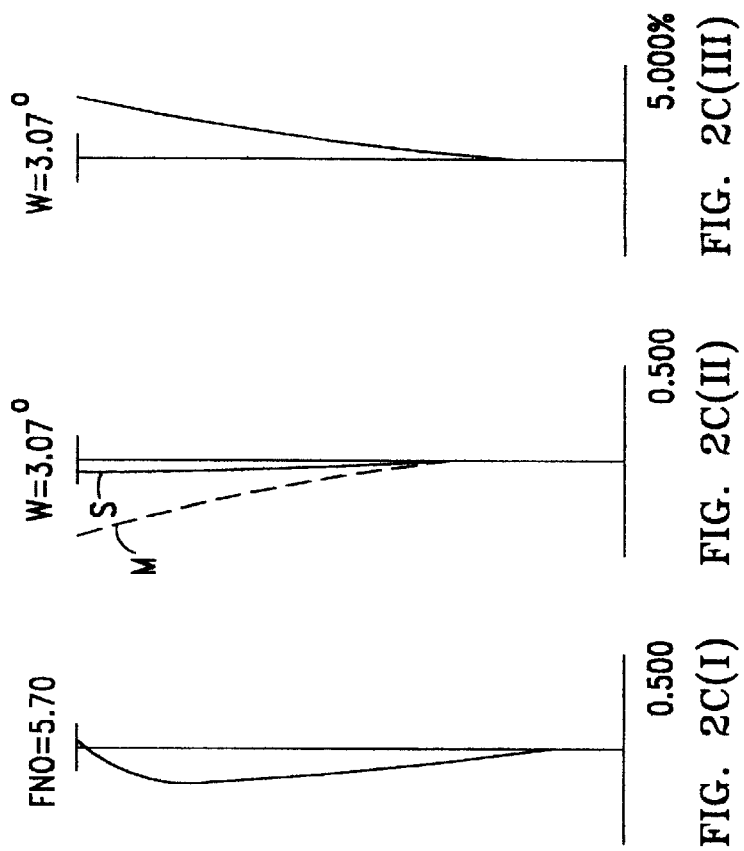

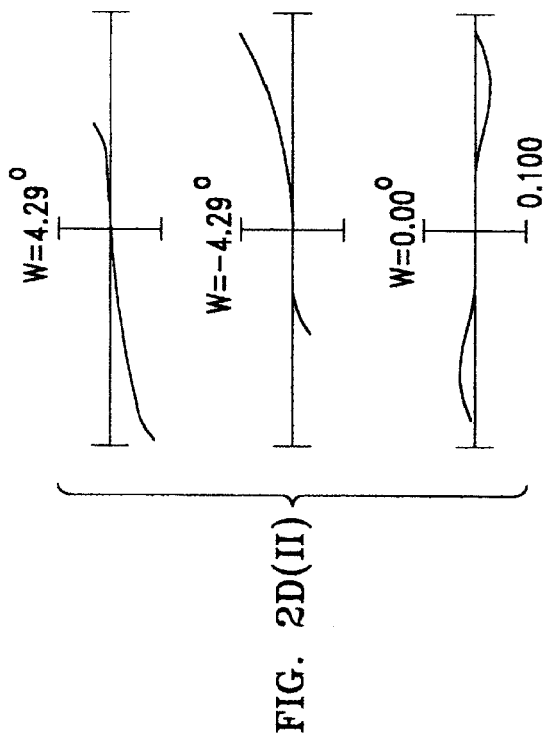
FIG. 2D(II)
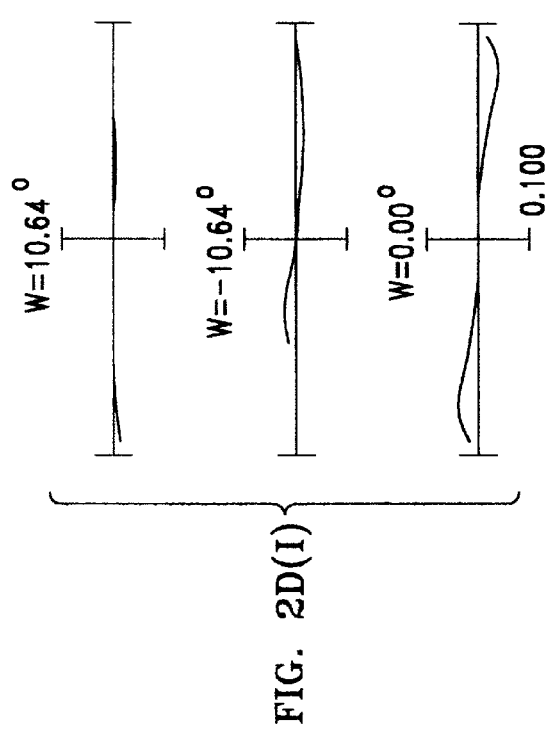
FIG. 2D(I)
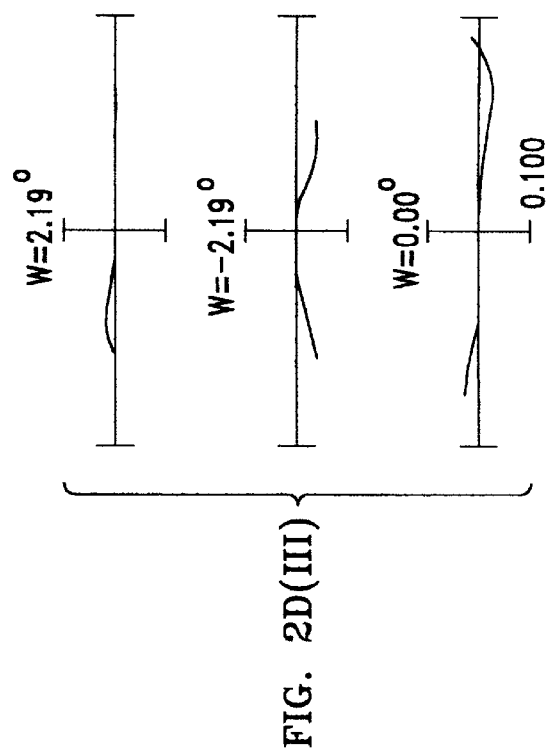
FIG. 2D(III)

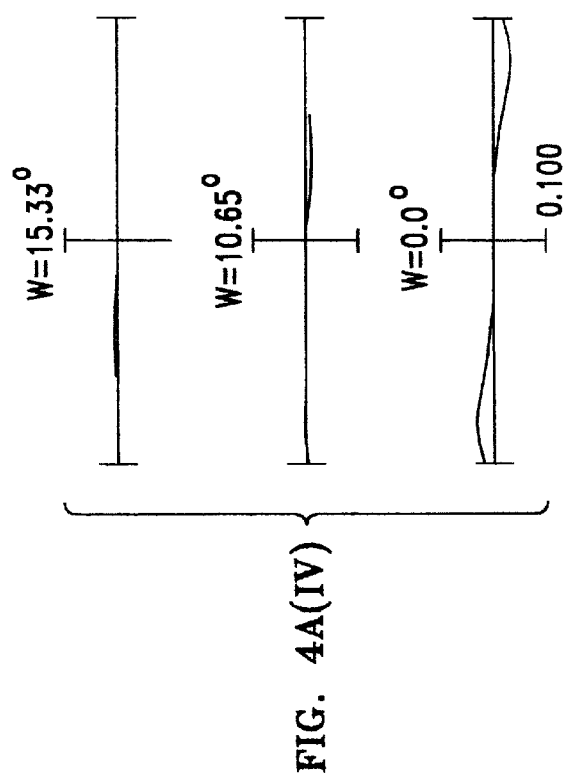
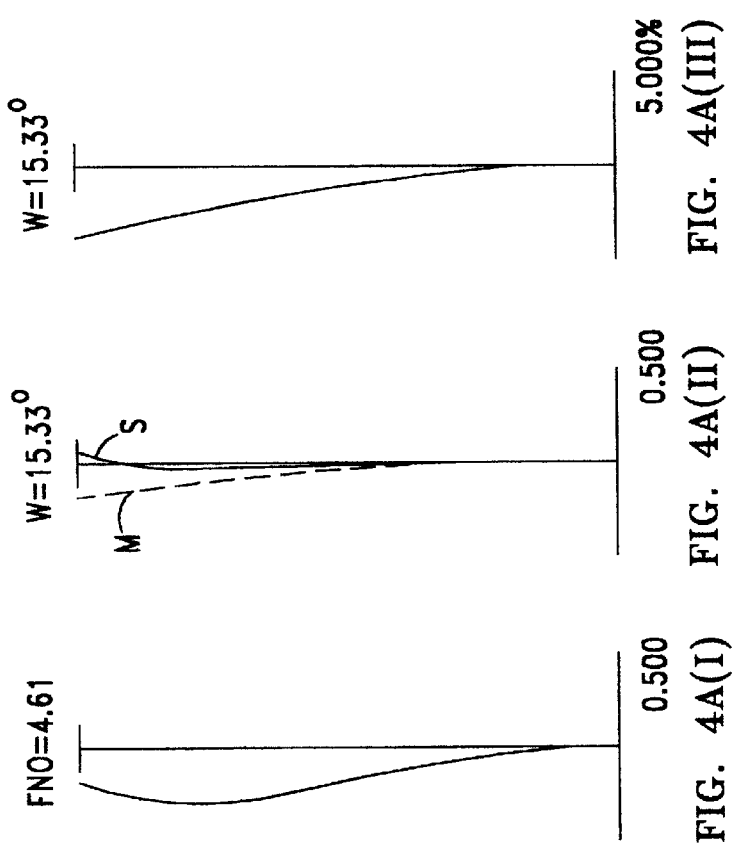

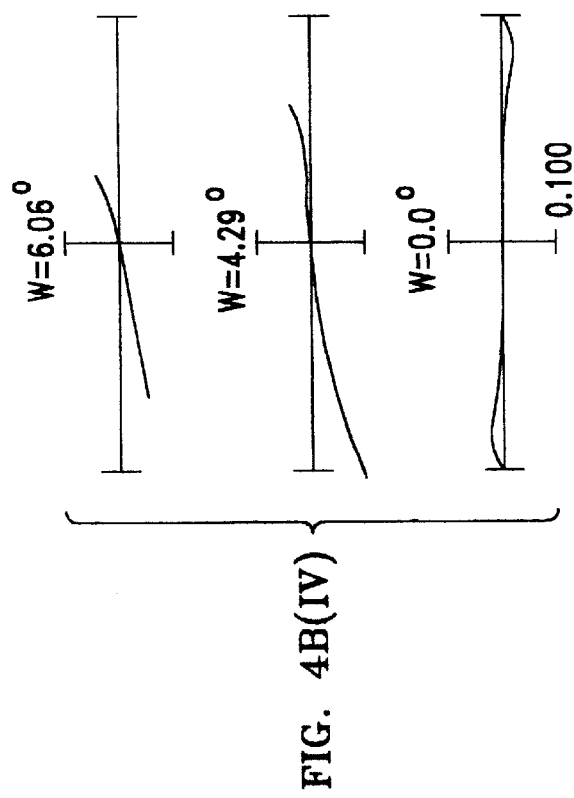
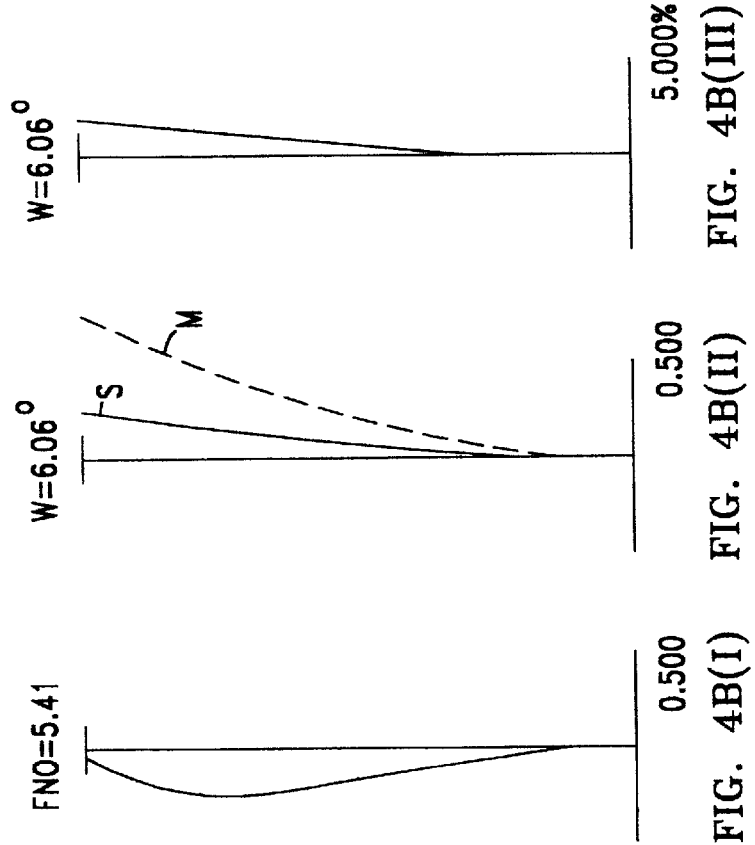

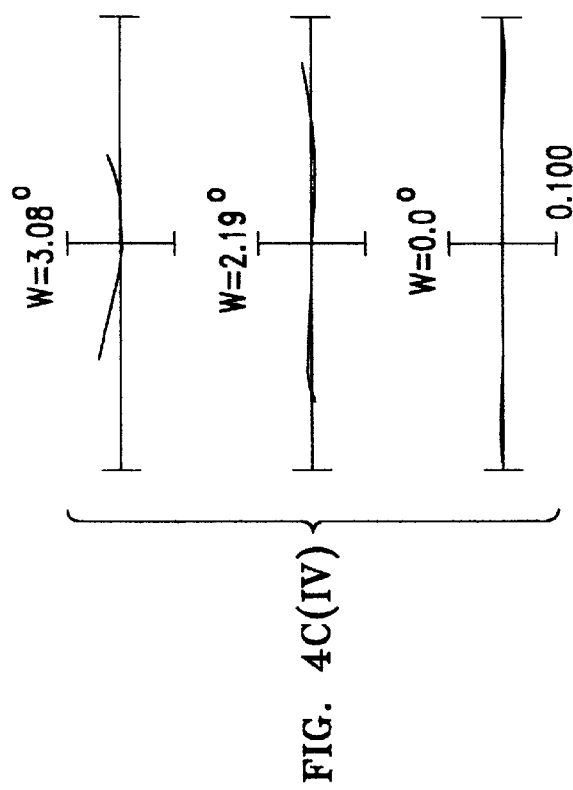
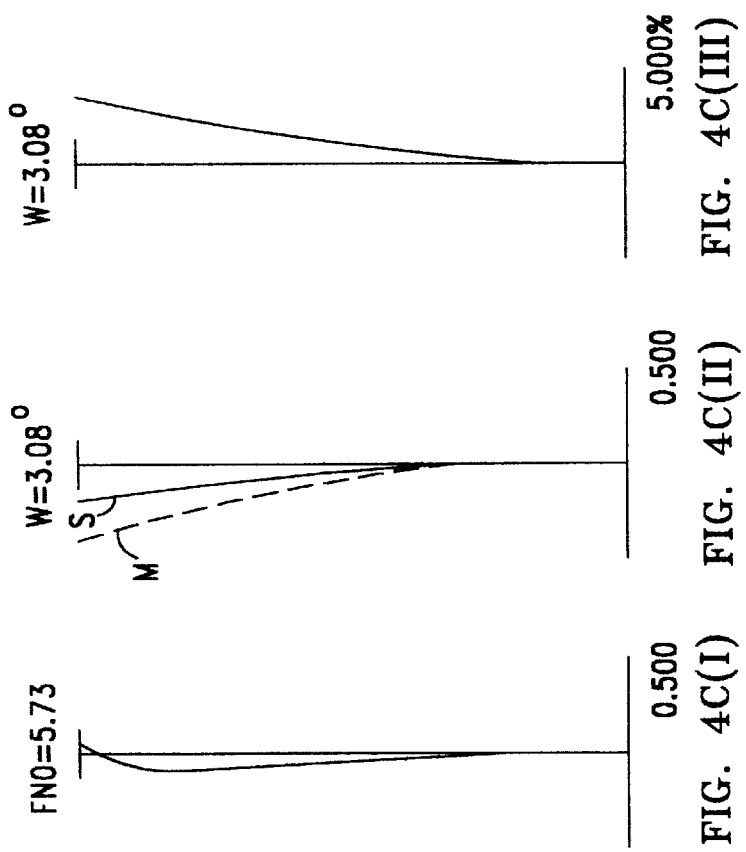
FIG. 4C(I)  FIG. 4C(II)  FIG. 4C(III)
FIG. 4C(IV)

FIG. 4D(II)

FIG. 4D(III)

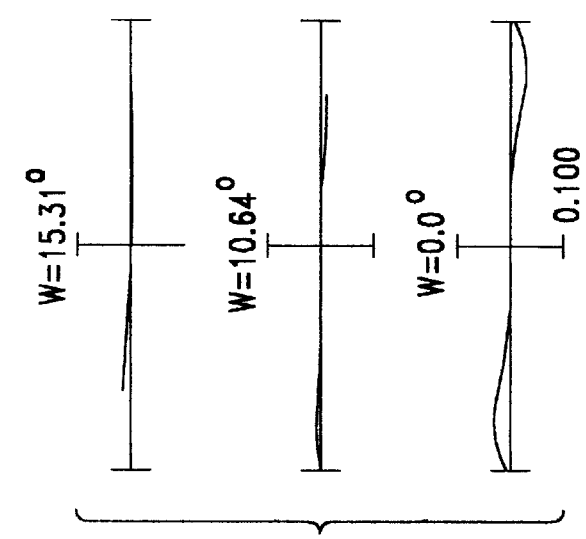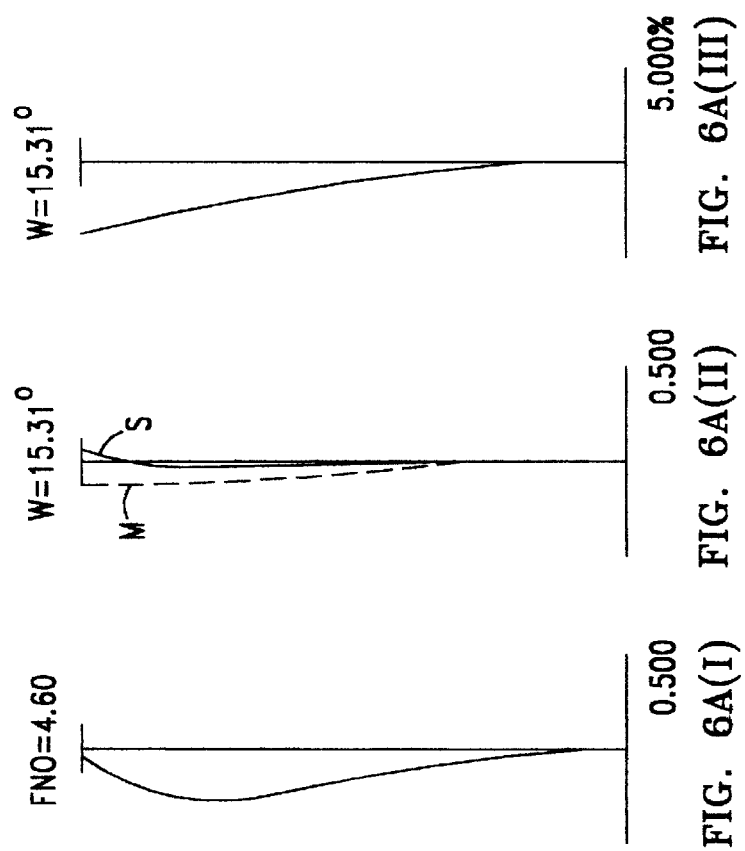

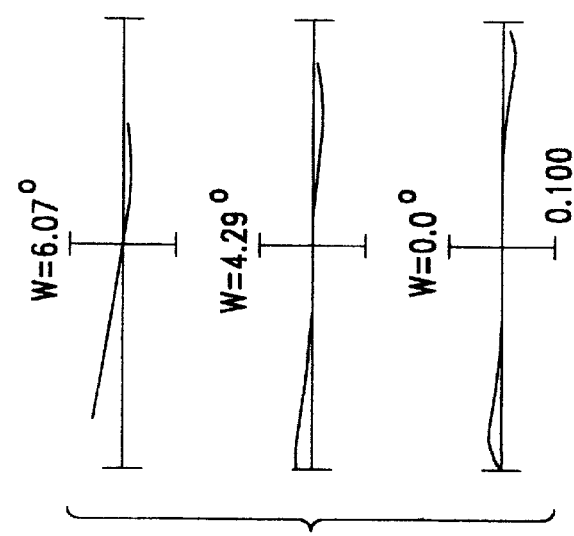
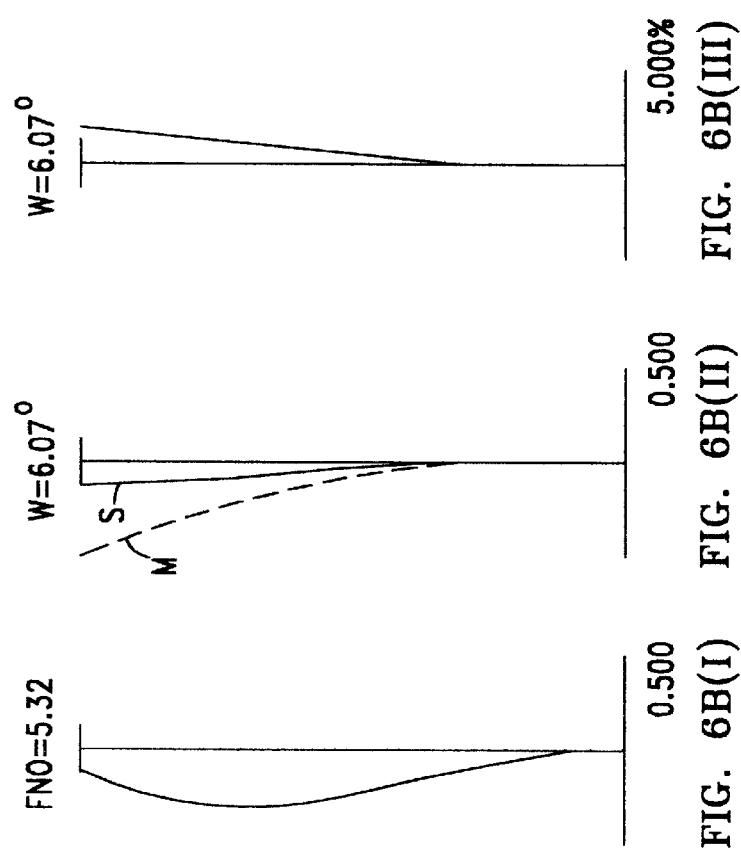
FIG. 6B(I)    FIG. 6B(II)    FIG. 6B(III)    FIG. 6B(IV)

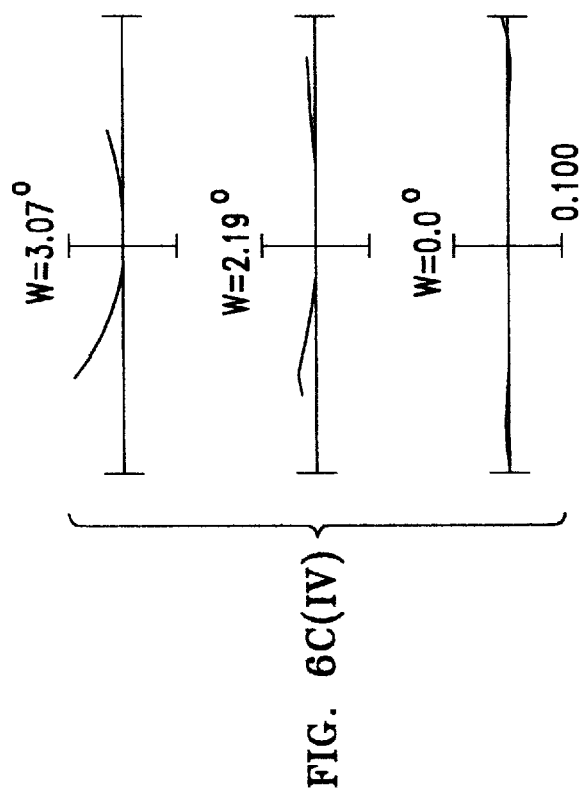
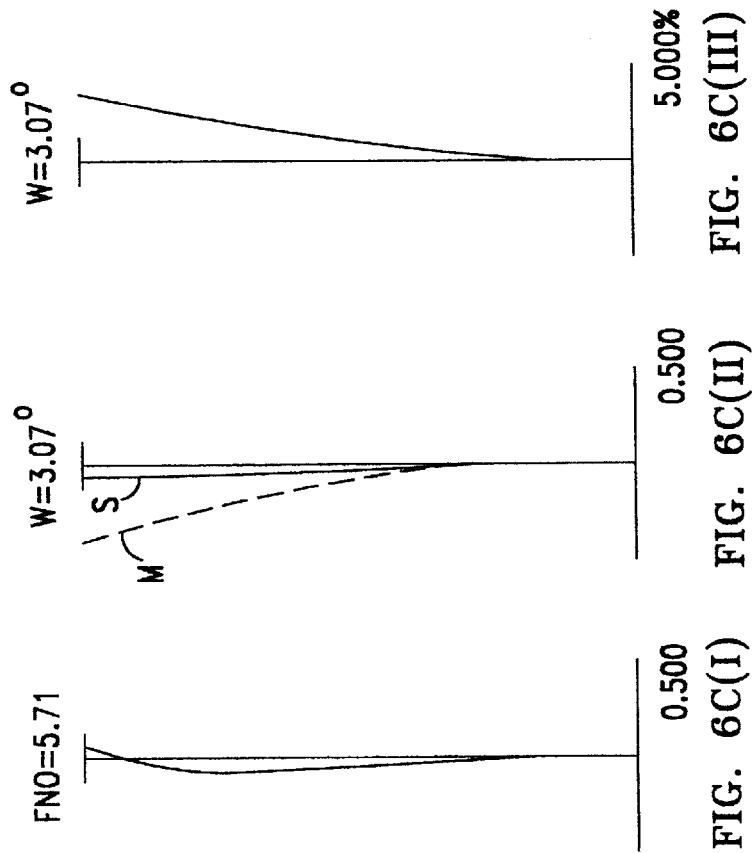

FIG. 6D(II)

FIG. 6D(III)

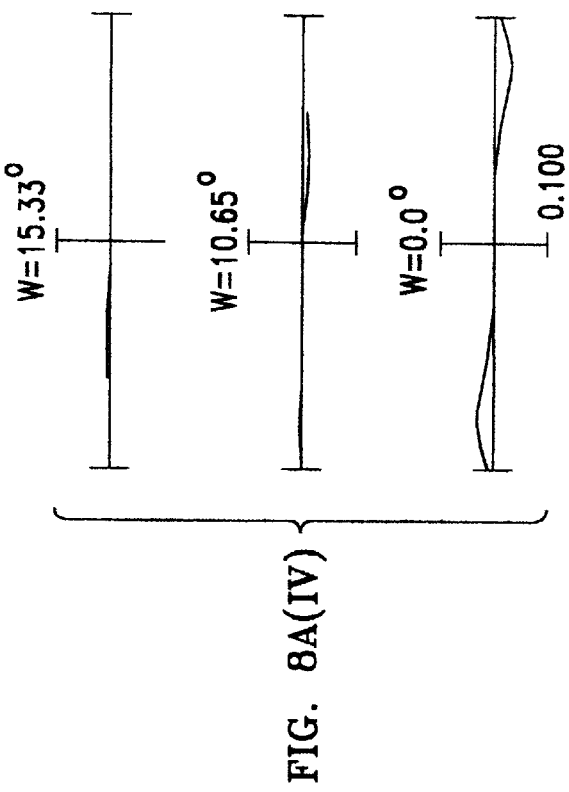
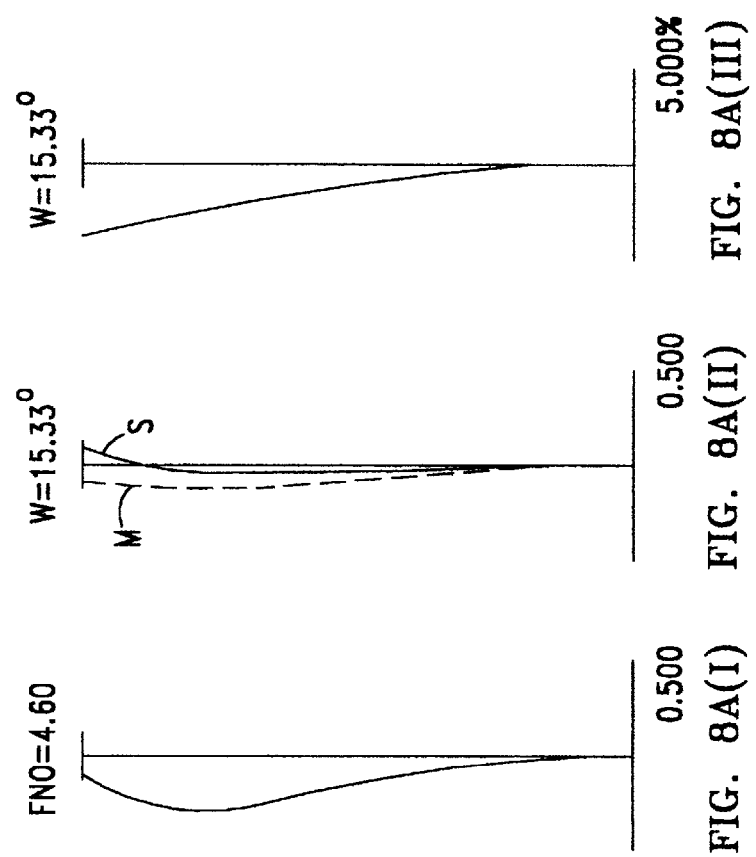
FIG. 8A(I)   FIG. 8A(II)   FIG. 8A(III)   FIG. 8A(IV)

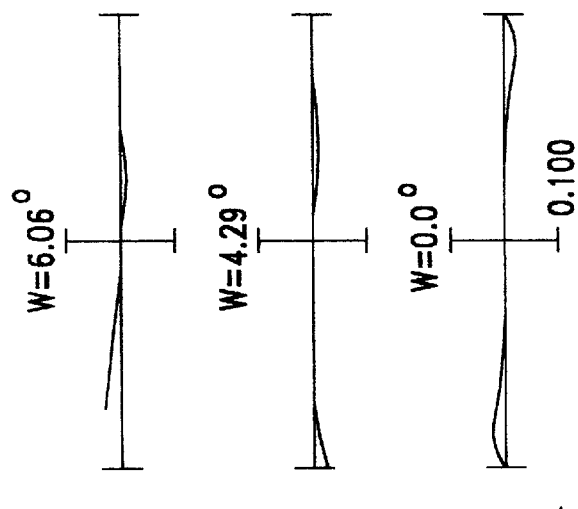
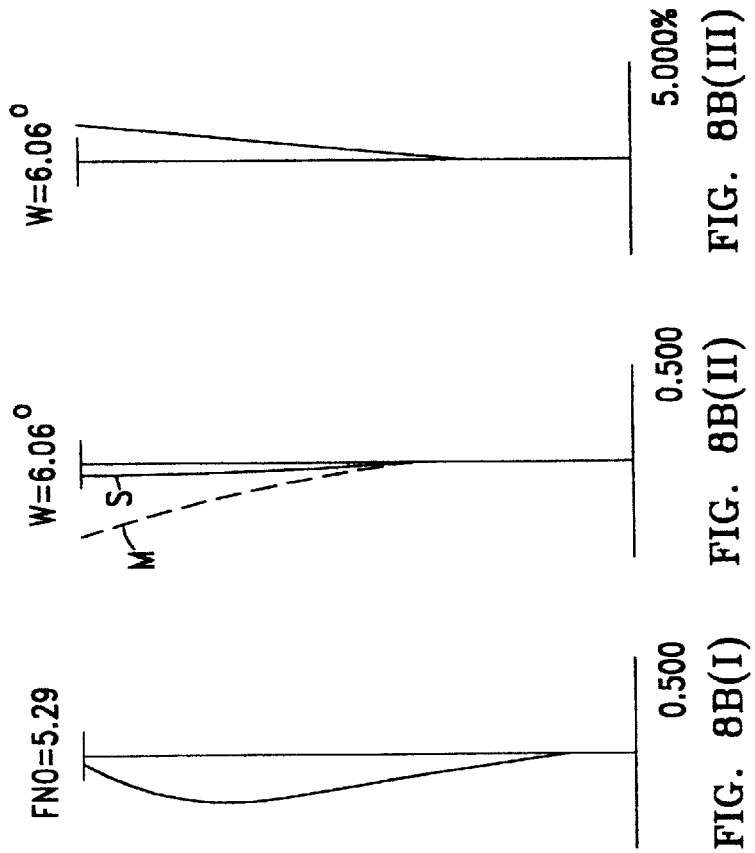

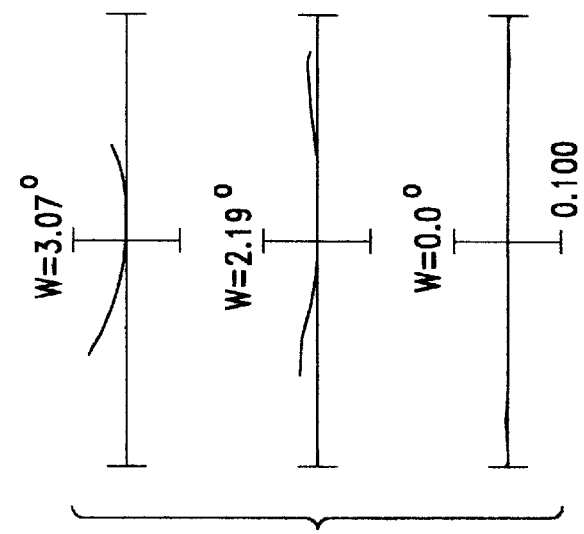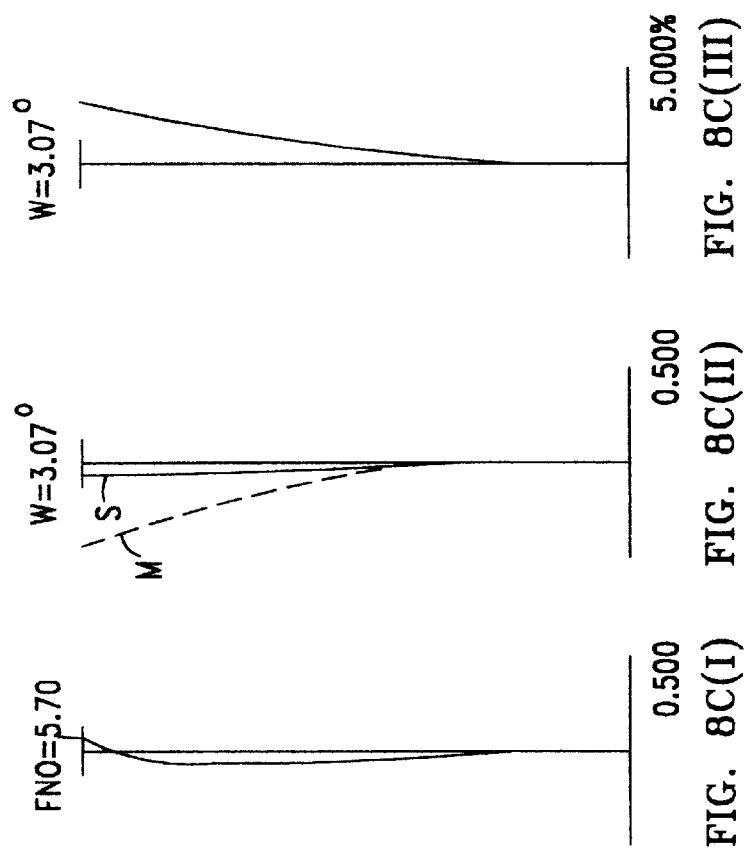

FIG. 8D(II)

FIG. 8D(III)

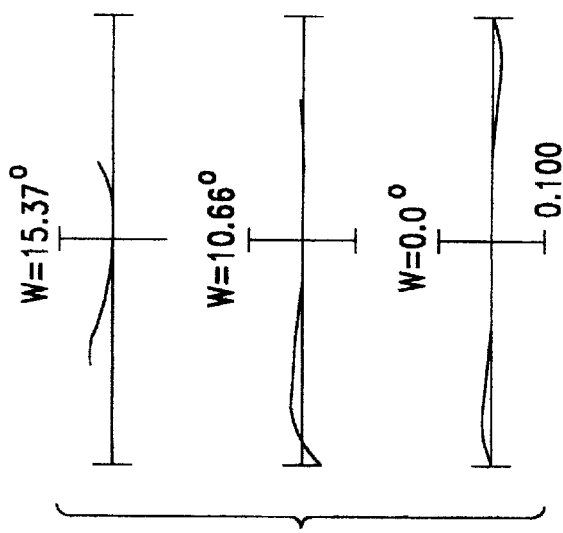
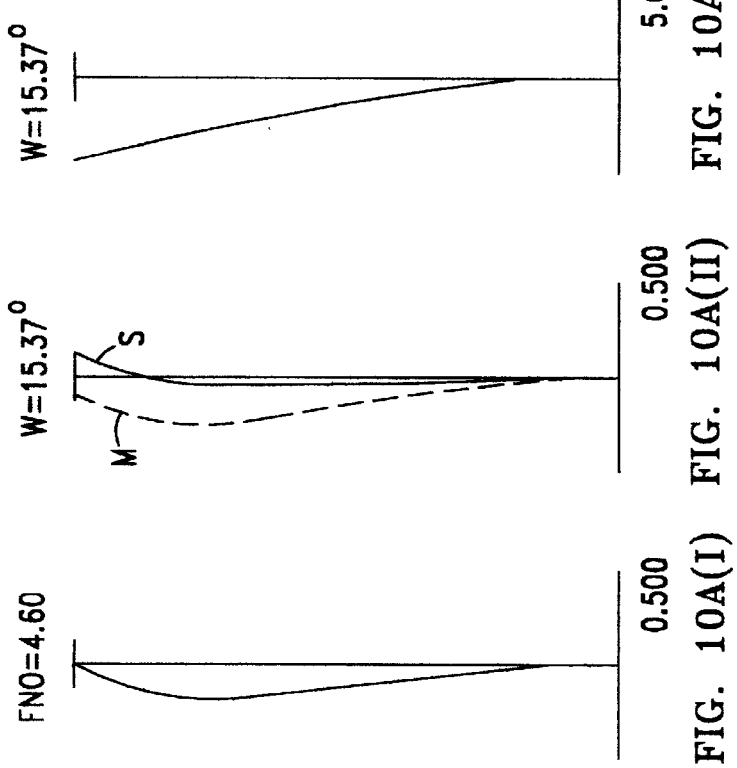

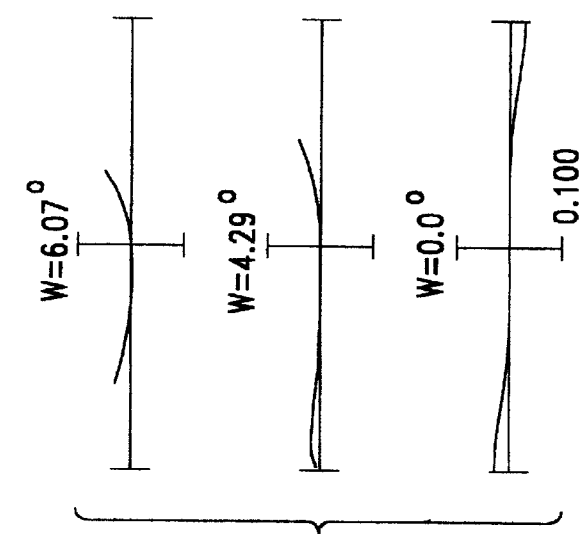
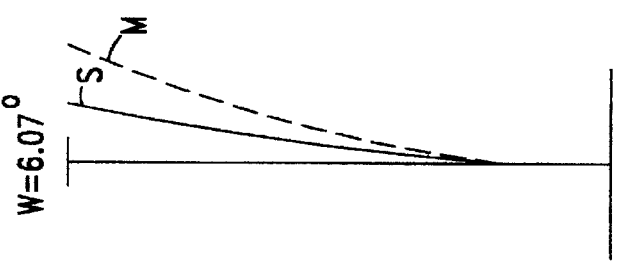
FIG. 10B(I)   FIG. 10B(II)   FIG. 10B(III)   FIG. 10B(IV)

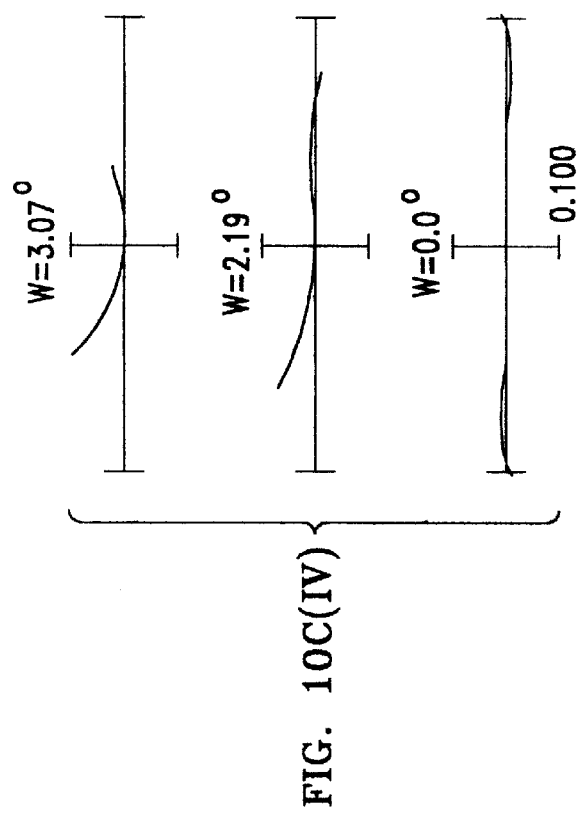
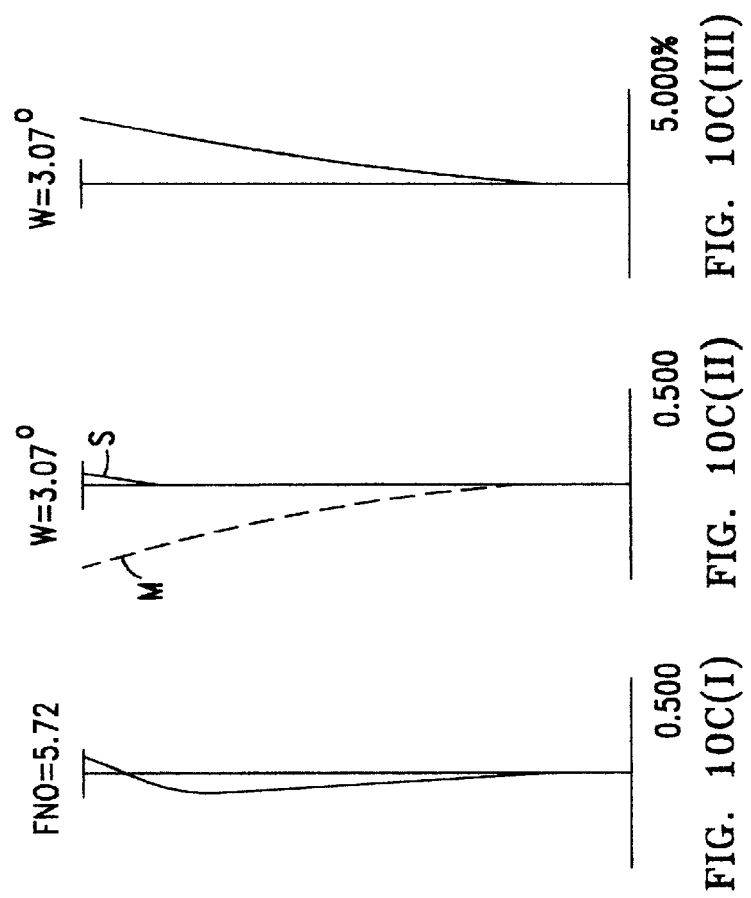
FIG. 10C(IV)
FIG. 10C(I)   FIG. 10C(II)   FIG. 10C(III)

FIG. 10D(II)

FIG. 10D(III)

ANTIVIBRATION ZOOM LENS

FIELD OF THE INVENTION

The present invention relates to a zoom lens for photography, video and the like, and more particularly relates to such a zoom lens having an antivibration function.

BACKGROUND OF THE INVENTION

A variety of proposals have heretofore been made for a zoom lens provided with an antivibration function. For example, in the zoom lenses comprising two or more lens groups as described in Japanese Patent Application Kokai No. Hei 1-189621, Japanese Patent Application Kokai No. Hei 1-191112, and Japanese Patent Application Kokai No. Hei 1-191113, the antivibration function is accomplished by moving an arbitrary lens group perpendicular to the optical axis. As described in Japanese Patent Application Kokai No. Hei 1-284823, the antivibration function is accomplished by moving perpendicular to the optical axis one of the lens groups in the fixed first lens group when varying power (i.e., when zooming). Also, as described in Japanese Patent Application Kokai No. Hei 6-130330, the antivibration function is performed by moving the entire fourth lens group perpendicular to the optical axis.

SUMMARY OF THE INVENTION

The present invention relates to a zoom lens for photography, video and the like, and more particularly relates to such a zoom lens having an antivibration function.

Accordingly, a first aspect of the present invention is a zoom lens having an antivibration function and capable of forming an image of an object over a zooming range from a maximum wide-angle state to a maximum telephoto state. The zoom lens comprises, objectwise to imagewise along an optical axis, a first lens group having a focal length f1 and positive refractive power. A second lens group is adjacent the first lens group and has a focal length f2, negative refractive power and comprises at least three lens sub-groups. At least one of the at least three lens sub-groups has a focal length f2B and is movable substantially perpendicularly to the optical axis. The zoom lens further includes at least third and fourth lens groups, wherein all the lens groups are separated by respective spacings. These spacings change when zooming from the maximum wide-angle state to the maximum telephoto state. In addition, the following condition is preferably satisfied:

$$1.0 < |f2B|/|f2| < 3.7 \tag{1}$$

A second aspect of the invention is the zoom lens as described above, wherein the at least three lens groups each have negative refractive power.

A third aspect of the invention is the zoom lens as described above, wherein the antivibration lens group comprises a cemented lens comprising a positive lens with an index of refraction Na with respect to d-line wavelength light, and negative lens with an index of refraction Nb with respect to d-line wavelength light, and wherein the following condition is satisfied:

$$0.1 < |Na - Nb| \tag{2}$$

A fourth aspect of the invention is the zoom lens as described above, wherein the antivibration lens group has a most objectwise lens surface with a radius of curvature R1 and a most imagewise lens surface with a radius of curvature R2, and wherein the following condition is satisfied:

$$-0.5 < (R2+R1)/(R2-R1) < 0.5 \tag{3}$$

A fifth aspect of the invention is a zoom lens as described above, wherein the zoom lens has an overall focal length in the maximum telephoto state of fT, an F-number in the maximum telephoto state of $FNO_T$, and wherein the following condition is satisfied:

$$1.5 < FNO_T \cdot f1/fT < 3.0 \tag{4}$$

A sixth aspect of the invention is a zoom lens as described above, wherein the overall focal length of the zoom lens in the maximum wide-angle state is fW, and wherein the following condition is satisfied:

$$0.3 < |f2|/fW < 0.7$$

BRIEF DESCRIPTION OF THE DRAWINGS

FIGS. 2A(I)–2A(IV) are plots of spherical aberration, astigmatism, distortion and coma at infinite focus and in the maximum wide-angle state for Working Example 1 when the antivibration function is not engaged;

FIGS. 2B(I)–2B(IV) are plots of spherical aberration, astigmatism, distortion and coma at infinite focus and in an intermediate focal length state for Working Example 1 when the antivibration function is not engaged;

FIGS. 2C(I)–2C(IV) are plots of spherical aberration, astigmatism, distortion and coma at infinite focus and in the maximum telephoto state for Working Example 1 when the antivibration function is not engaged;

FIGS. 2D(I)–2D(III) are plots of coma at infinite focus and in the maximum wide-angle state, intermediate focal length state and maximum telephoto state, respectively, for Working Example 1 when the antivibration function is engaged;

FIGS. 4A(I)–4A(IV) are plots of spherical aberration, astigmatism, distortion and coma at infinite focus and in the maximum wide-angle state for Working Example 2 when the antivibration function is not engaged;

FIGS. 4B(I)–4B(IV) are plots of spherical aberration, astigmatism, distortion and coma at infinite focus and in an intermediate focal length state for Working Example 2 when the antivibration function is not engaged;

FIGS. 4C(I)–4C(IV) are plots of spherical aberration, astigmatism, distortion and coma at infinite focus and in the maximum telephoto state for Working Example 2 when the antivibration function is not engaged;

FIGS. 6A(I)–6A(IV) are plots of spherical aberration, astigmatism, distortion and coma at infinite focus and in the maximum wide-angle state for Working Example 3 when the antivibration function is not engaged;

FIGS. 6B(I)–6B(IV) are plots of spherical aberration, astigmatism, distortion and coma at infinite focus and in an intermediate focal length state for Working Example 3 when the antivibration function is not engaged;

FIGS. 6C(I)–6C(IV) are plots of spherical aberration, astigmatism, distortion and coma at infinite focus and in the maximum telephoto state for Working Example 3 when the antivibration function is not engaged;

FIGS. 8A(I)–8A(IV) are plots of spherical aberration, astigmatism, distortion and coma at infinite focus and in the maximum wide-angle state for Working Example 4 when the antivibration function is not engaged;

FIGS. 8B(I)–8B(IV) are plots of spherical aberration, astigmatism, distortion and coma at infinite focus and in an intermediate focal length state for Working Example 4 when the antivibration function is not engaged;

FIGS. 8C(I)–8C(IV) are plots of spherical aberration, astigmatism, distortion and coma at infinite focus and in the maximum telephoto state for Working Example 4 when the antivibration function is not engaged;

FIGS. 10A(I)–10A(IV) are plots of spherical aberration, astigmatism, distortion and coma at infinite focus and in the maximum wide-angle state for Working Example 5 when the antivibration function is not engaged;

FIGS. 10B(I)–10B(IV) are plots of spherical aberration, astigmatism, distortion and coma at infinite focus and in an intermediate focal length state for Working Example 5 when the antivibration function is not engaged;

FIGS. 10C(I)–10C(IV) are plots of spherical aberration, astigmatism, distortion and coma at infinite focus and in the maximum telephoto state for Working Example 5 when the antivibration function is not engaged.

DETAILED DESCRIPTION OF THE INVENTION

The present invention relates to a zoom lens for photography, video and the like, and more particularly relates to such a zoom lens having an antivibration function.

Figure 1:
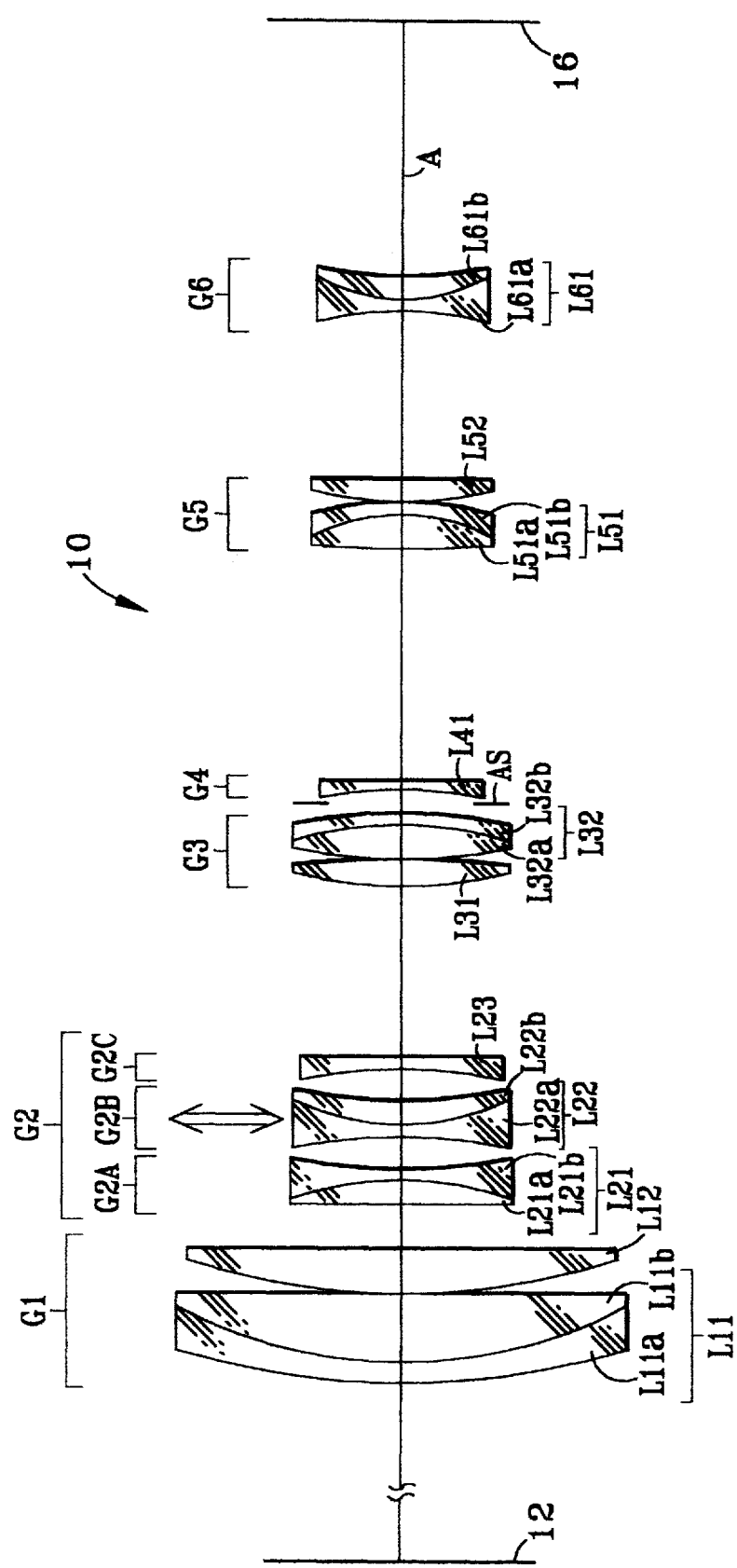
FIG. 1 is a schematic optical diagram of the zoom lens of the present invention according to Working Example 1.

With reference to FIG. 1, zoom lens 10 is but one example (e.g., Working Example 1, discussed below) of the antivibration zoom lens of the present invention, which comprises, from object plane 12 to image plane 16 along optical axis A (i.e., objectwise to imagewise), a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. When zooming from the maximum wide-angle state to the maximum telephoto state, the axial spacing between first lens group G1 and second lens group G2 increases, the axial spacing between second lens group G2 and third lens group G3 decreases, the axial spacing between third lens group G3 and fourth lens group G4 increases, the axial spacing between fourth lens group G4 and fifth lens group G5 changes, and the axial spacing between fifth lens group G5 and sixth lens group G6 decreases. In addition, first lens group G1 moves axially when focusing on an object in object plane 12.

A correction optical system for a zoom lens that decenters one or more lenses with respect to the optical axis for the purpose of preventing vibration (i.e., performing an antivibration function) generally needs to be compact, lightweight and have a small displacement with respect to the optical axis. It is also preferable to make the retainer and drive mechanism (not shown) compact, and to reduce the amount of power consumed. In addition, to minimize deterioration in optical performance when the antivibration function is engaged, it is preferable to make the correction optical system the lens group wherein the off-axis light beam passes in the vicinity of the optical axis across the entire zooming range (i.e, from the extreme wide-angle state to the extreme telephoto state). Accordingly, a lens group in the vicinity of aperture stop AS is preferably adopted as the correction optical system.

To satisfy these conditions to the extent possible in the present invention, one of lens sub-groups G2A–G2C in second lens group G2, which is comparatively close to aperture stop AS, is preferably used. Each of these lens sub-groups has a small lens diameter, a large refractive power, and requires only a small amount of displacement with respect to optical axis A to perform the antivibration function.

Second lens group G2 has a strong tendency for its negative refractive power to become excessively large in attempting to achieve the greatest variable power when zooming and to achieve increased magnification. Accordingly, it is preferable to construct second lens group G2 with at least the three aforementioned lens sub-groups G2A–G2C. Consequently, the generation of spherical aberration and off-axis coma can be reduced across the entire zoom region, and high imaging performance can be obtained.

It is important in the zoom lens of the present invention to reduce the difference in the amount of aberration generated between when the antivibration function is engaged and when it is not, and to reduce the deterioration in imaging performance when the antivibration function is engaged. Thus, it is necessary to reduce the amount of aberration generated by the correction optical system itself when the antivibration function is not engaged. Also, it is necessary to minimize the change in the angle of deviation of the emergent light with respect to the incident light of the on-axis light beam passing through the correction optical system (i.e., difference between the incident angle of the on-axis light beam that enters the correction optical system and the emergent angle when that light beam exits the correction optical system) even when correcting image vibration. Accordingly, it is preferable to reduce both the incident angle and emergent angle of the on-axis light beam in second lens group G2, and to make lens sub-group G2B, which is axially interposed between lens sub-groups G2A and G2C, the correction optical system, i.e., the antivibration lens group.

The antivibration zoom lens of the present invention also preferably satisfies one or more of a number of design conditions, set forth below.

For example, it is preferable that antivibration lens sub-group G2B satisfy design condition (1) below:

$$1.0 < |f2B|/|f2| < 3.7 \tag{1}$$

wherein f2B is the focal length of antivibration lens sub-group G2B in second lens group G2, and f2 is the focal length of second lens group G2.

Condition (1) stipulates an appropriate ratio between the focal length of antivibration lens sub-group G2B and the focal length of second lens group G2. If $|f2B|/|f2|$ exceeds the upper limit in condition (1), the amount of decentering with respect to the optical axis of antivibration lens sub-group G2B when the antivibration function is engaged increases. This invites an increase in the size of the retainer and drive mechanism and in the amount of power consumed.

If $|f2B|/|f2|$ falls below the lower limit in condition (1), the Petzval sum of antivibration lens sub-group G2B decreases, and the deterioration in imaging performance when the antivibration function is engaged becomes significant.

To better realize the effects of the present invention, it is preferable in condition (1) to make the upper limit value 3.2 and the lower limit value 1.5.

The negative refractive power of second lens group G2 is large in the present invention. However, the fact that each of the at least three lens sub-groups G2A–G2C in second lens group G2 has negative refractive power makes it possible to spread the negative refractive power throughout second lens group G2. This is favorable from the standpoint of correcting aberration.

In the antivibration zoom lens of the present invention, it is necessary to reduce as much as possible the amount of aberration generated in antivibration lens sub-group G2B to maintain satisfactory imaging performance when the antivibration function is engaged. Also, it is preferable that antivibration lens sub-group G2B be a cemented lens comprising positive lens L22a and a negative lens L22b (see, e.g., FIG. 1). Consequently, the generation of various aberrations, including chromatic aberration when the antivibration function is engaged, can be reduced.

It is also preferable that positive lens L22a and negative lens L22b satisfy design condition (2), below:

$$0.1 < |Na - Nb| \tag{2}$$

wherein Na is the refractive index of positive lens L22a with respect to the d-line, and Nb is the refractive index of negative lens L22b with respect to the d-line.

Condition (2) stipulates an appropriate difference in refractive index for positive lens L22a and negative lens L22b in antivibration lens sub-group G2B with respect to the d-line. If |Na−Nb| falls below the lower limit in condition (2), chromatic aberration can be corrected when the antivibration function is engaged, but this is not preferred. This is because the effect for correcting other aberrations decreases due to the small difference in refractive index with respect to the d-line, which invites a deterioration in imaging performance when the antivibration function is engaged.

In addition, it is preferable the antivibration zoom lens of the present invention satisfy condition (3), below:

$$-0.5 < (R2+R1)/(R2-R1) < 0.5 \tag{3}$$

wherein R1 is the radius of curvature of the most objectwise lens surface of antivibration lens sub-group G2B, and R2 is the radius of curvature of the most imagewise lens surface of antivibration lens sub-group G2B.

Condition (3) assigns an appropriate range to the shape parameter of antivibration lens sub-group G2B. If (R2+R1)/(R2−R1) exceeds the upper limit or falls below the lower limit in condition (3), the angle of deviation of the emergent light with respect to the incident light of the on-axis light beam passing through antivibration lens sub-group G2B when the antivibration function is engaged (i.e., the difference between the incident angle of the on-axis light beam that enters antivibration lens sub-group G2B and the emergent angle when that light beam exits antivibration lens sub-group G2B) changes greatly compared with when the antivibration function is not engaged. This invites an increase in the amount of aberration generated when the antivibration function is engaged. Consequently high imaging performance can not be maintained when the antivibration function is engaged.

It is also preferable that the antivibration zoom lens of the present invention satisfy design condition (4), below:

$$1.5 < FNO_T \cdot f1/fT < 3.0 \tag{4}$$

wherein fT is the composite focal length of the entire system in the maximum telephoto state, f1 is the focal length of first lens group G1, and $FNO_T$ is the F-number in the maximum telephoto state.

Condition (4) assigns an appropriate value to the apparent F-number of first lens group G1 in the maximum telephoto state. If $FNO_T \cdot f1/fT$ exceeds the upper limit in condition (4), the focal length of first lens group G1 lengthens excessively, the amount of movement of first lens group G1 increases when focusing. Consequently, compactness and lightweightness can no longer be achieved.

Conversely, if $FNO_T \cdot f1/fT$ falls below the lower limit in condition (4), the focal length of first lens group G1 shortens excessively, fluctuations in the maximum telephoto state due to focusing of various aberrations can no longer be controlled, and imaging performance declines.

In addition, it is preferable the antivibration zoom lens of the present invention satisfy design condition (5), below:

$$0.3 < |f2|/fW < 0.7 \tag{5}$$

wherein fW is the composite focal length of the entire system in the maximum wide-angle state, and f2 is the focal length of second lens group G2.

Condition (5) assigns an appropriate ratio between the focal length of second lens group G2 and the composite focal length of the entire system in the maximum wide-angle state. If |f2|/fW exceeds the upper limit in condition (5), it is difficult to ensure the required sufficient back focus in the maximum wide-angle state.

Conversely, if |f2|/fW falls below the lower limit in condition (5), the lens diameters of the plurality of lens groups positioned imagewise of second lens group G2 increases, making it difficult to achieve compactness and lightweightness.

It is also possible in the present invention to employ a method whereby a tilt system rotates antivibration lens sub-group G2B about a single point on the optical axis when performing the antivibration function. Furthermore, the zoom lens according to the present invention can be made more compact and made to have higher imaging performance by introducing an aspherical surface.

WORKING EXAMPLES

Each Working Example of the antivibration zoom lens of the present invention has the basic configuration as described above with respect to zoom lens 10 of FIG. 1. Tables 1A–5A below set forth the various design specification values for Working Examples 1–5, respectively, of the zoom lens of present invention. In these Tables, f is the focal length, FNO is the F-number, 2ω is as the field angle, and Bf is the back focus. Also, S indicates the objectwise to imagewise sequence of lens surfaces, R indicates the radius of curvature for each lens surface, D indicates the spacing between adjacent lens surfaces, Vd indicates the Abbe number, and Nd indicates the refractive index. The Abbe number Vd and the refractive index Nd are with respect to the d-line (λ=587.6 nm). The amount of movement of the antivibration lens group and the amount of movement of the image are taken as positive in the upward direction in the Figures.

Further, Tables 1B–5B set forth the variable spacing when zooming at infinite focus for Working Examples 1–5, respectively. Tables 1C–5C set forth values related to engaging the antivibration function for Working Examples 1–5, respectively. Tables 1D–5D set forth values corresponding to the design conditions for Working Examples 1–5, respectively.

FIGS. 2, 4, 6, 8 and 10 are aberration plots for Working Examples 1–5, respectively. In each of the aberration plots, FNO is the F- number, and ω is the half field-angle. In addition, in the aberration plots for astigmatism (FIGS. 2A(II), 4A(II), 6A(II), 8A(II) and 10A(II)), the solid line indicates the sagittal image plane S, and the broken line indicates the meridional image plane M.

Working Example 1

With reference to FIG. 1 and antivibration zoom lens 10, first lens group G1 comprises, objectwise to imagewise, a cemented lens L11 comprising a negative meniscus lens L11*a* whose convex surface faces objectwise and a biconvex lens L11*b*, and a biconvex lens L12. Second lens group G2 comprises, objectwise to imagewise, lens sub-group G2A comprising cemented lens L21 comprising positive meniscus lens L21*a* whose concave surface faces objectwise and a biconcave lens L21*b*, lens sub-group G2B comprising a cemented lens L22 comprising biconcave lens L22*a* and positive meniscus lens L22*b* whose convex surface faces objectwise, and lens sub-group G2C comprising biconcave lens L23. Third lens group G3 comprises, objectwise to imagewise, a biconvex lens L31 and a cemented lens L32 comprising a biconvex lens L32*a* and a negative meniscus lens L32*b* whose concave surface faces objectwise. Fourth lens group G4 comprises one biconcave lens L41. Fifth lens group G5 comprises, objectwise to imagewise, a cemented lens L51 comprising a biconvex lens L51*a* and a negative meniscus lens L51*b* whose concave surface faces objectwise, and a biconvex lens L52. Sixth lens group G6 comprises, objectwise to imagewise, a cemented lens L61 comprising a biconcave lens L61*a* and a positive meniscus lens L61*b* whose convex surface faces objectwise. Furthermore, aperture stop AS is arranged between third lens group G3 and fourth lens group G4.

TABLE 1A

DESIGN SPECIFICATIONS
f = 82.000 mm – 390.000 mm
FNO = 4.602 – 5.699
2ω = 30.66° – 6.14°

| S | R | D | Vd | Nd |
|---|---|---|---|---|
| 1 | 126.7716 | 3.7000 | 25.41 | 1.805182 |
| 2 | 79.9886 | 11.0000 | 82.52 | 1.497820 |
| 3 | −2055.6763 | 0.2000 | | 1.000000 |
| 4 | 117.9785 | 7.3000 | 82.52 | 1.497820 |
| 5 | −906.2409 | d5 | | 1.000000 |
| 6 | −15577.1660 | 3.9000 | 25.41 | 1.805182 |
| 7 | −57.2071 | 1.8000 | 40.90 | 1.796310 |
| 8 | 168.8912 | 4.5736 | | 1.000000 |
| 9 | −95.0141 | 1.7000 | 60.03 | 1.640000 |
| 10 | 32.0450 | 4.1000 | 33.89 | 1.803840 |
| 11 | 74.4412 | 4.9512 | | 1.000000 |
| 12 | −115.6889 | 2.0000 | 45.37 | 1.796681 |
| 13 | 79135.9480 | d13 | | 1.000000 |
| 14 | 62.8733 | 4.7000 | 70.41 | 1.487490 |
| 15 | −182.4992 | 0.2000 | | 1.000000 |
| 16 | 80.6970 | 5.5000 | 70.41 | 1.487490 |
| 17 | −56.1366 | 2.0000 | 40.90 | 1.796310 |
| 18 | −117.6956 | d18 | | 1.000000 |
| 19 | −62.7055 | 1.5000 | 64.10 | 1.516800 |
| 20 | 1147.7140 | d20 | | 1.000000 |
| 21 | 134.3940 | 5.4000 | 70.41 | 1.487490 |
| 22 | −30.0602 | 2.0000 | 25.41 | 1.805182 |
| 23 | −50.0206 | 0.2000 | | 1.000000 |
| 24 | 53.5997 | 3.5000 | 64.10 | 1.516800 |
| 25 | −602.0424 | d25 | | 1.000000 |
| 26 | −75.0368 | 1.5000 | 45.37 | 1.796681 |
| 27 | 25.8430 | 4.0000 | 25.41 | 1.805182 |
| 28 | 76.4832 | Bf | | 1.000000 |

TABLE 1B

VARIABLE SPACING WHEN ZOOMING (INFINITE FOCUS)

| f | 82.000 | 200.000 | 390.000 |
|---|---|---|---|
| d5 | 7.42382 | 42.78673 | 59.35655 |
| d13 | 28.17593 | 16.35257 | 5.00406 |
| d18 | 4.12170 | 15.94507 | 27.29358 |
| d20 | 37.61504 | 28.65559 | 32.22220 |
| d25 | 26.90151 | 16.53637 | 1.46427 |
| Bf | 41.25649 | 60.58108 | 72.08660 |

TABLE 1C

EFFECT OF ENGAGING ANTIVIBRATION FUNCTION

| f | 82 mm | 200 mm | 390 mm |
|---|---|---|---|
| Amount of movement of antivibration lens sub-group (mm) | 0.8 | 0.8 | 0.8 |
| Amount of image movement (mm) | −0.682 | −1.124 | −1.699 |

TABLE 1D

VALUES CORRESPONDING TO DESIGN CONDITIONS

| Na | 1.803840 |
|---|---|
| Nb | 1.640000 |
| R1 | −95.014 |
| R2 | 74.441 |
| fW | 82.000 |
| fT | 390.000 |
| f1 | 135.327 |
| f2 | −39.471 |

TABLE 1D-continued

VALUES CORRESPONDING TO DESIGN CONDITIONS

| | |
|---|---|
| f2B | −80.000 |
| $FNO_T$ | 5.699 |
| (1) \|f2B\|/\|f2\| | 2.027 |
| (2) \|Na − Nb\| | 0.163840 |
| (3) (R2 + R1)/(R2 − R1) | −0.121 |
| (4) $FNO_T \cdot f1/fT$ | 1.978 |
| (5) \|f2\|/fW | 0.481 |

FIGS. 2A–2D are aberration plots with respect to the d-line (λ=587.6 nm) for Working Example 1. From these aberration plots, it can be seen that, for every case in Working Example 1 including every focal length state, the various aberrations are satisfactorily corrected and superior imaging performance is obtained even when the antivibration function is engaged.

Working Example 2

Figure 3:
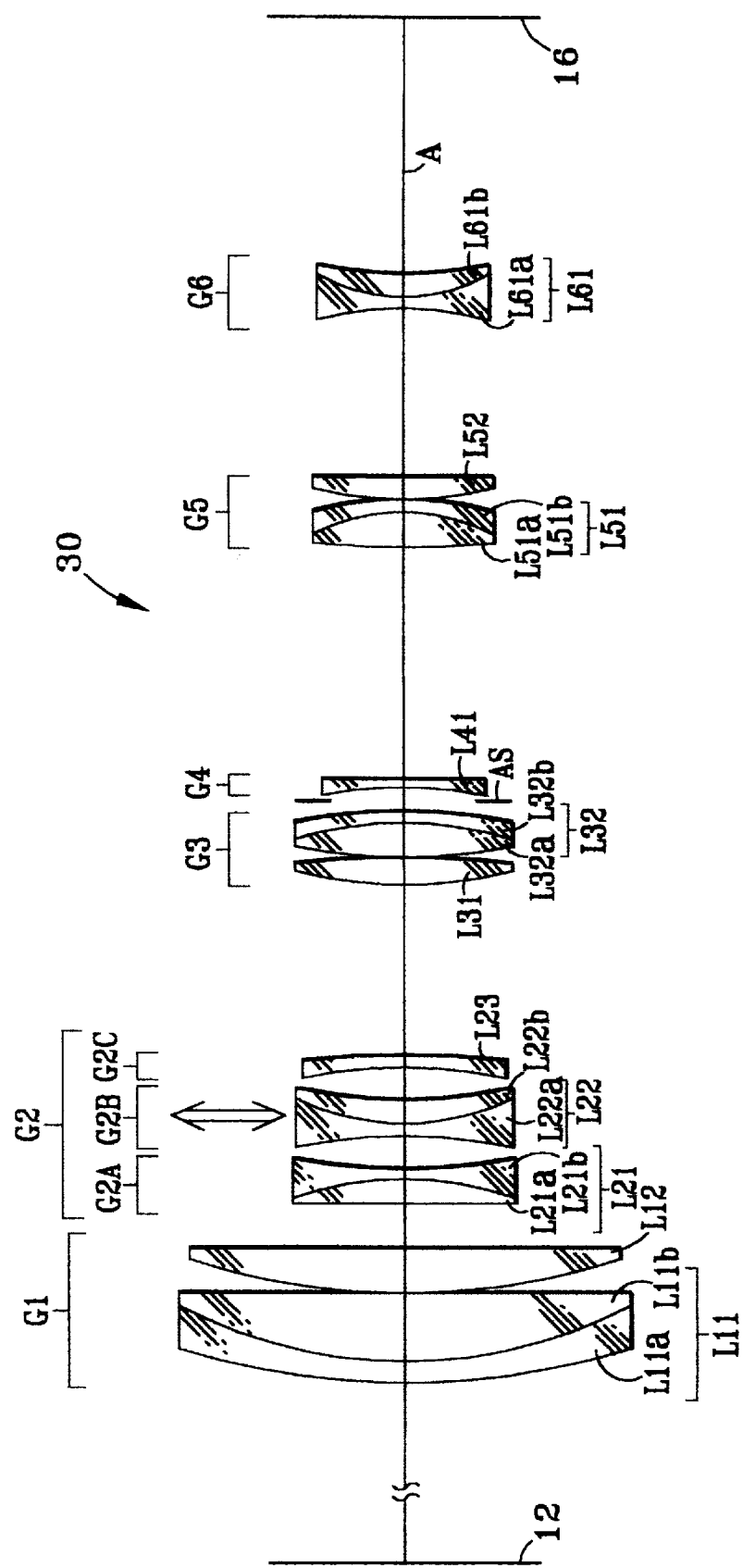
FIG. 3 is a schematic optical diagram of the zoom lens of the present invention according to Working Example 2.
Figure 4D:
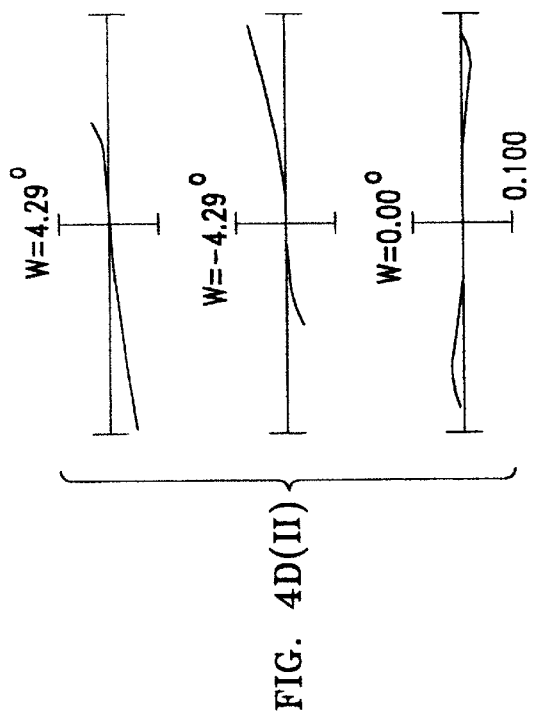
FIGS. 4D(I)–4D(III) are plots of coma at infinite focus and in the maximum wide-angle state, intermediate focal length state and maximum telephoto state, respectively, for Working Example 2 when the antivibration function is engaged.
Figure 4D:
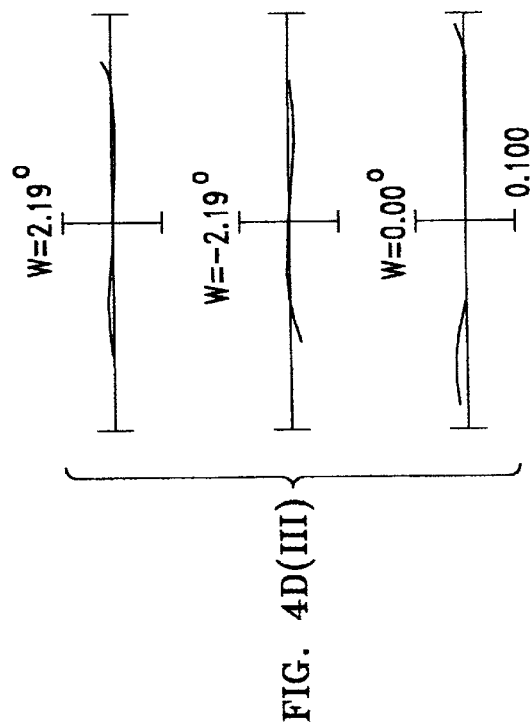
Figure 4D:
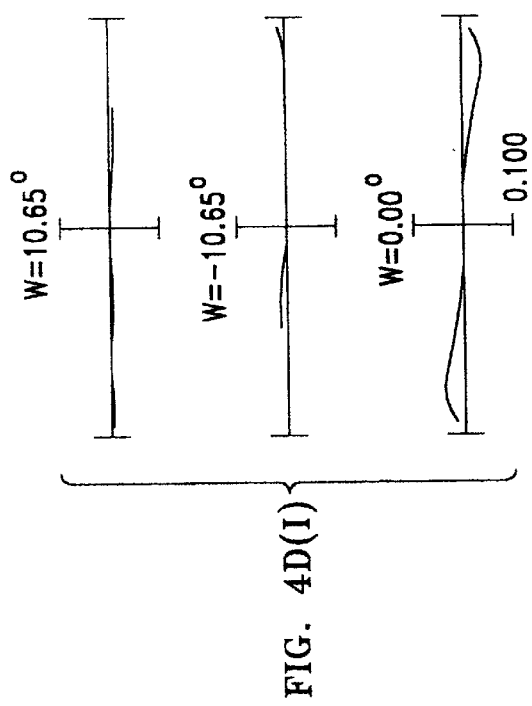

With reference to FIG. 3, antivibration zoom lens 30 comprises similar lens elements as those of zoom lens 10 of Working Example 1, except that lens L23 in lens sub-group G2C is a negative meniscus lens whose concave surface faces objectwise, and lens L41 in fourth lens group G4 is a negative meniscus lens whose concave surface faces objectwise. Likewise, aperture stop AS is arranged between third lens group G3 and fourth lens group G4.

TABLE 2A

DESIGN SPECIFICATIONS
f = 82.000 mm − 390.000 mm
FNO = 4.609 − 5.733
2ω = 30.66° − 6.15°

| S | R | D | Vd | Nd |
|---|---|---|---|---|
| 1 | 126.8200 | 3.7000 | 25.41 | 1.805182 |
| 2 | 80.1823 | 11.0000 | 82.52 | 1.497820 |
| 3 | −1906.3761 | 0.2000 | | 1.000000 |
| 4 | 115.5621 | 7.3000 | 82.52 | 1.497820 |
| 5 | −1153.4648 | d5 | | 1.000000 |
| 6 | −436.3402 | 3.9000 | 25.41 | 1.805182 |
| 7 | −55.7552 | 1.8000 | 45.37 | 1.796681 |
| 8 | 147.3405 | 3.9950 | | 1.000000 |
| 9 | −117.2946 | 1.7000 | 60.03 | 1.640000 |
| 10 | 38.7302 | 3.7000 | 33.89 | 1.803840 |
| 11 | 97.3804 | 5.6009 | | 1.000000 |
| 12 | −72.4513 | 2.0000 | 45.37 | 1.796681 |
| 13 | −196.7135 | d13 | | 1.000000 |
| 14 | 86.2440 | 4.7000 | 70.41 | 1.487490 |
| 15 | −172.9919 | 0.2000 | | 1.000000 |
| 16 | 81.6223 | 5.5000 | 70.41 | 1.487490 |
| 17 | −58.9591 | 2.0000 | 40.90 | 1.796310 |
| 18 | −92.5276 | d18 | | 1.000000 |
| 19 | −55.9302 | 1.5000 | 64.10 | 1.516800 |
| 20 | −957.9031 | d20 | | 1.000000 |
| 21 | 122.1647 | 5.4000 | 70.41 | 1.487490 |
| 22 | −30.9644 | 2.0000 | 25.41 | 1.805182 |
| 23 | −54.5251 | 0.2000 | | 1.000000 |
| 24 | 64.9078 | 3.5000 | 64.10 | 1.516800 |
| 25 | −163.7957 | d25 | | 1.000000 |
| 26 | −76.7651 | 1.5000 | 45.37 | 1.796681 |
| 27 | 25.8257 | 4.0000 | 25.41 | 1.805182 |
| 28 | 74.7821 | Bf | | 1.000000 |

TABLE 2B

VARIABLE SPACING WHEN ZOOMING (INFINITE FOCUS)

| f | 82.000 | 200.000 | 390.000 |
|---|---|---|---|
| d5 | 8.15314 | 43.69737 | 60.26527 |
| d13 | 26.53641 | 14.62007 | 3.21361 |
| d18 | 5.17532 | 17.09165 | 28.49811 |
| d20 | 37.32014 | 28.46874 | 32.28053 |
| d25 | 27.02506 | 16.43257 | 1.12113 |
| Bf | 41.29099 | 60.73491 | 72.23459 |

TABLE 2C

EFFECT OF ENGAGING ANTIVIBRATION FUNCTION

| f | 82 mm | 200 mm | 390 mm |
|---|---|---|---|
| Amount of movement of antivibration lens sub-group(mm) | 0.8 | 0.8 | 0.8 |
| Amount of image movement (mm) | −0.529 | −0.870 | −1.315 |

TABLE 2D

VALUES CORRESPONDING TO DESIGN CONDITIONS

| | |
|---|---|
| Na | 1.803840 |
| Nb | 1.640000 |
| R1 | −117.295 |
| R2 | 97.380 |
| fW | 82.000 |
| fT | 390.000 |
| f1 | 135.327 |
| f2 | −39.912 |
| f2B | −105.000 |
| $FNO_T$ | 5.733 |
| (1) \|f2B\|/\|f2\| | 2.631 |
| (2) \|Na − Nb\| | 0.163840 |
| (3) (R2 + R1)/(R2 − R1) | −0.093 |
| (4) $FNO_T \cdot f1/fT$ | 1.989 |
| (5) \|f2\|/fW | 0.487 |

FIGS. 4A–4D are aberration plots with respect to the d-line (λ=587.6 nm) for Working Example 2. From these aberration plots, it can be seen that, for every case in Working Example 2 including every focal length state, the various aberrations are satisfactorily corrected and superior imaging performance is obtained even when the antivibration function is engaged.

Working Example 3

Figure 5:
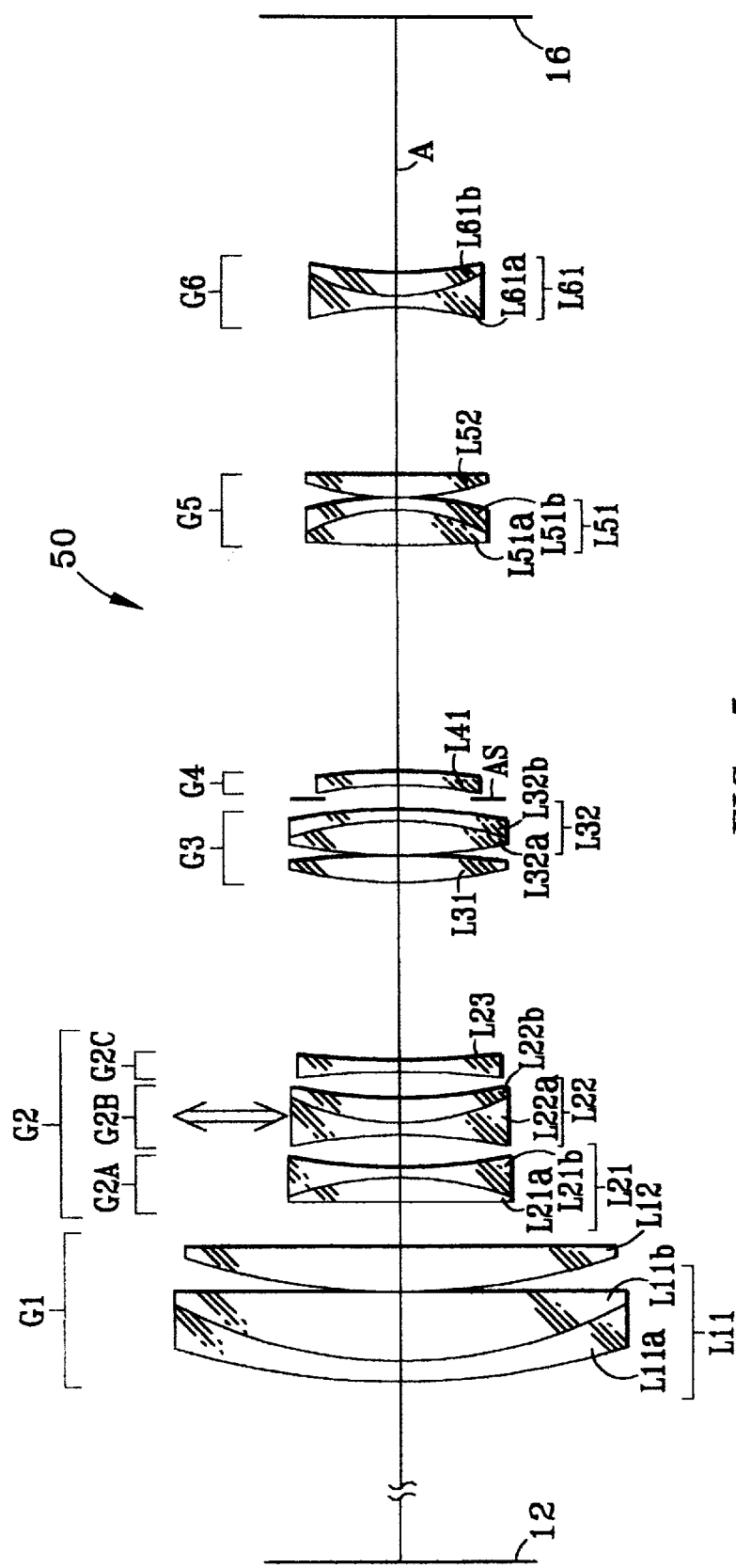
FIG. 5 is a schematic optical diagram of the zoom lens of the present invention according to Working Example 3.
Figure 6D:
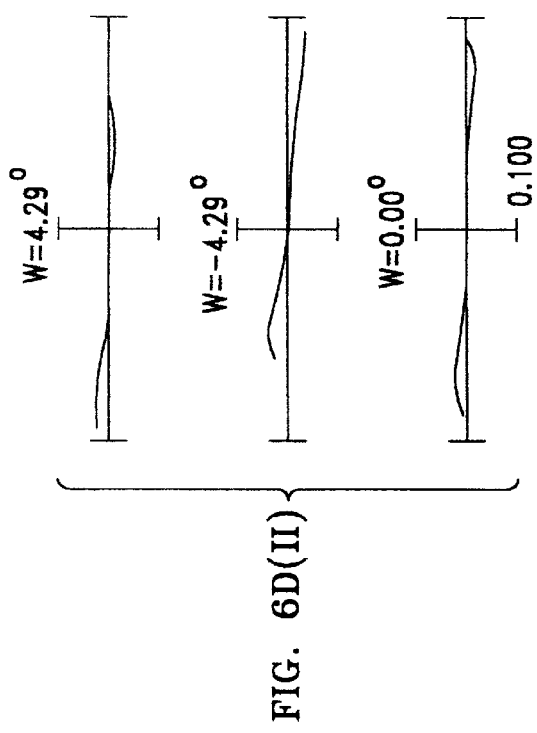
FIGS. 6D(I)–6D(III) are plots of coma at infinite focus and in the maximum wide-angle state, intermediate focal length state and maximum telephoto state, respectively, for Working Example 3 when the antivibration function is engaged.
Figure 6D:
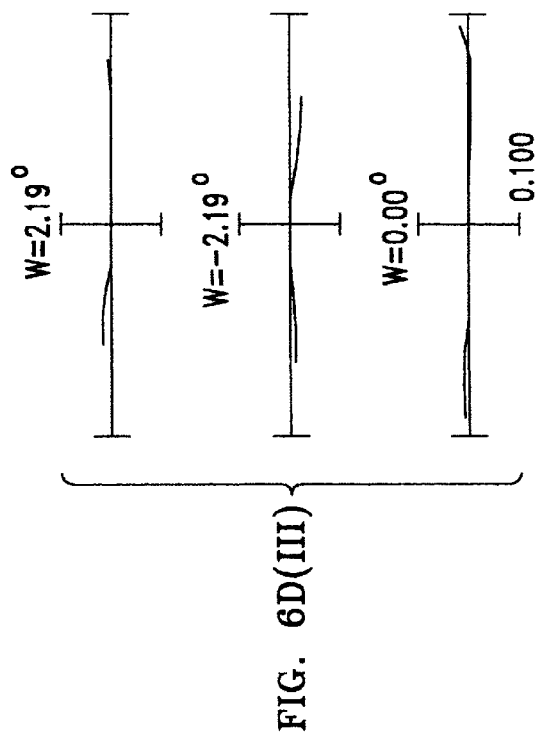
Figure 6D:
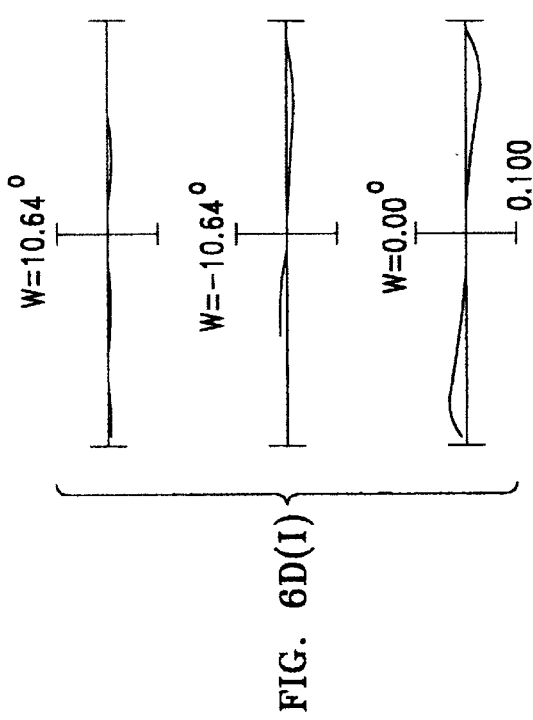

With reference to FIG. 5, antivibration zoom lens 50 comprises similar lens elements as those of zoom lens 30 of Working Example 2, except that lens L12 is a positive meniscus lens whose convex surface faces objectwise, lens L23 is a biconcave lens, and lens L32b is a biconcave lens. Likewise, aperture stop AS is arranged between third lens group G3 and fourth lens group G4.

TABLE 3A

DESIGN SPECIFICATIONS
f = 82.000 mm – 390.000 mm
FNO = 4.604 – 5.706
2ω = 30.62° – 6.15°

| S | R | D | Vd | Nd |
|---|---|---|----|----|
| 1 | 116.6051 | 3.7000 | 25.41 | 1.805182 |
| 2 | 77.6888 | 11.8000 | 82.52 | 1.497820 |
| 3 | −478.2821 | 0.2000 | | 1.000000 |
| 4 | 136.6895 | 5.9000 | 82.52 | 1.497820 |
| 5 | 3925.6664 | d5 | | 1.000000 |
| 6 | −249.6323 | 3.5000 | 25.41 | 1.805182 |
| 7 | −56.1648 | 1.8000 | 45.37 | 1.796681 |
| 8 | 176.8033 | 3.8451 | | 1.000000 |
| 9 | −103.0599 | 1.7000 | 60.03 | 1.640000 |
| 10 | 40.1106 | 3.7000 | 33.89 | 1.803840 |
| 11 | 109.4269 | 4.3226 | | 1.000000 |
| 12 | −164.2816 | 2.0000 | 45.37 | 1.796681 |
| 13 | 358.1137 | d13 | | 1.000000 |
| 14 | 69.1313 | 4.3000 | 70.41 | 1.487490 |
| 15 | −183.9573 | 0.2000 | | 1.000000 |
| 16 | 60.8107 | 4.6000 | 70.41 | 1.487490 |
| 17 | −153.8200 | 2.0000 | 40.76 | 1.581440 |
| 18 | 620.0448 | d18 | | 1.000000 |
| 19 | −57.5125 | 2.5000 | 70.41 | 1.487490 |
| 20 | −119.7637 | d20 | | 1.000000 |
| 21 | 135.7912 | 5.3000 | 70.41 | 1.487490 |
| 22 | −31.2472 | 1.5000 | 25.41 | 1.805182 |
| 23 | −57.4114 | 0.2000 | | 1.000000 |
| 24 | 55.5339 | 3.2000 | 70.41 | 1.487490 |
| 25 | −924.8084 | d25 | | 1.000000 |
| 26 | −71.1892 | 1.5000 | 45.37 | 1.796681 |
| 27 | 24.9264 | 4.4000 | 25.41 | 1.805182 |
| 28 | 91.4330 | Bf | | 1.000000 |

TABLE 3B

VARIABLE SPACING WHEN ZOOMING (INFINITE FOCUS)

| f | 82.000 | 200.000 | 390.000 |
|---|--------|---------|---------|
| d5 | 3.55769 | 42.06526 | 60.99685 |
| d13 | 29.77245 | 16.29086 | 3.46892 |
| d18 | 5.38839 | 18.86999 | 31.69193 |
| d20 | 35.81480 | 23.98529 | 30.39364 |
| d25 | 26.94979 | 17.40487 | 2.21634 |
| Bf | 40.96151 | 62.33595 | 71.11610 |

TABLE 3C

EFFECT OF ENGAGING ANTIVIBRATION FUNCTION

| f | 82 mm | 200 mm | 390 mm |
|---|-------|--------|--------|
| Amount of movement of antivibration lens sub-group (mm) | 0.8 | 0.8 | 0.8 |
| Amount of image movement (mm) | −0.555 | −0.898 | −1.313 |

TABLE 3D

VALUES CORRESPONDING TO DESIGN CONDITIONS

| | |
|---|---|
| Na | 1.803840 |
| Nb | 1.640000 |
| R1 | −103.060 |
| R2 | 109.427 |
| fW | 82.000 |
| fT | 390.000 |
| f1 | 135.327 |
| f2 | −38.695 |

TABLE 3D-continued

VALUES CORRESPONDING TO DESIGN CONDITIONS

| | |
|---|---|
| f2B | −105.000 |
| $FNO_T$ | 5.706 |
| (1) $|f2B|/|f2|$ | 2.714 |
| (2) $|Na - Nb|$ | 0.163840 |
| (3) $(R2 + R1)/(R2 - R1)$ | 0.030 |
| (4) $FNO_T \cdot f1/fT$ | 1.980 |
| (5) $|f2|/fW$ | 0.472 |

FIGS. 6A–6D are aberration plots with respect to the d-line (λ=587.6 nm) for Working Example 3. From these aberration plots, it can be seen that, for every case in Working Example 1 including every focal length state, the various aberrations are satisfactorily corrected and superior imaging performance is obtained even when the antivibration function is engaged.

Working Example 4

Figure 7:
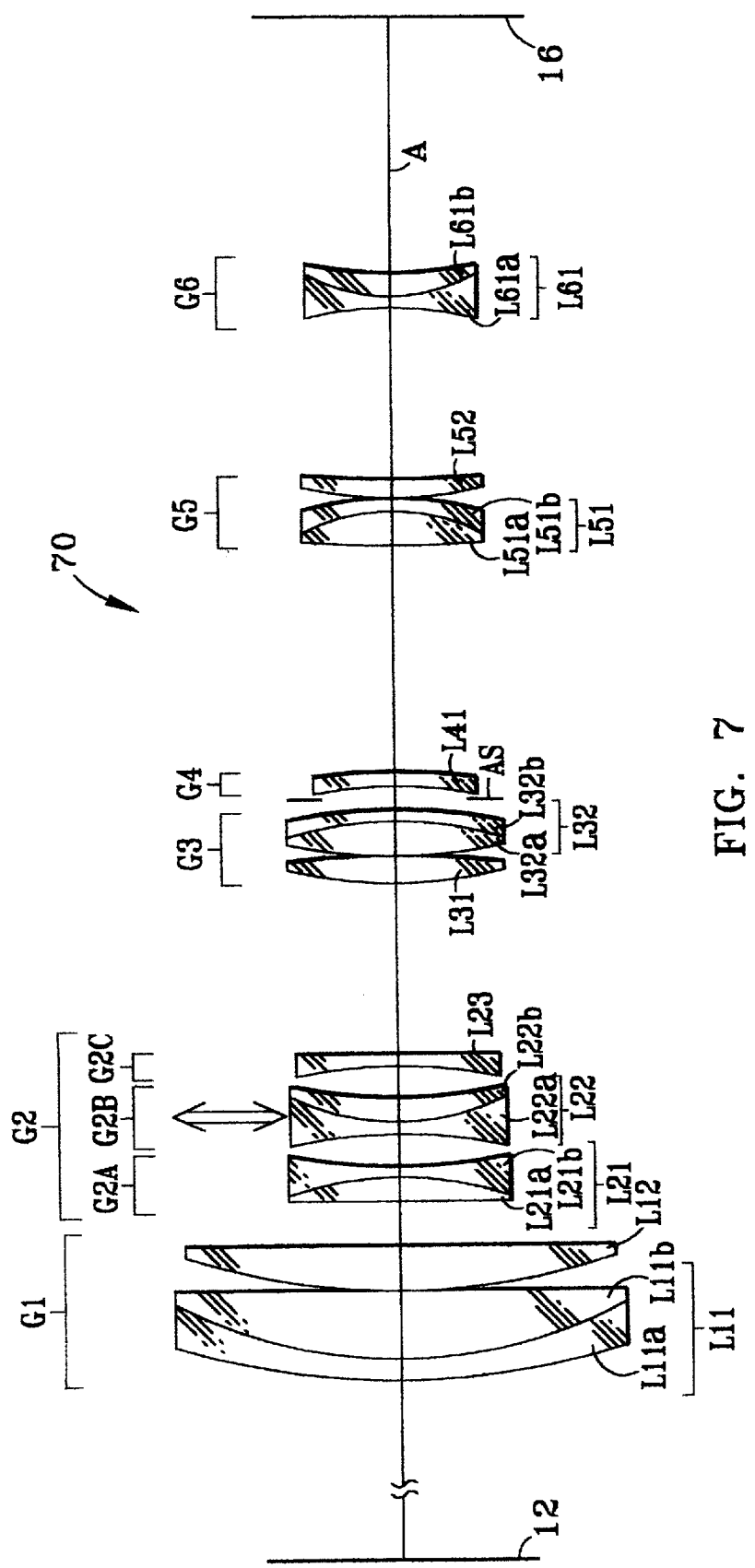
FIG. 7 is a schematic optical diagram of the zoom lens of the present invention according to Working Example 4.
Figure 8D:
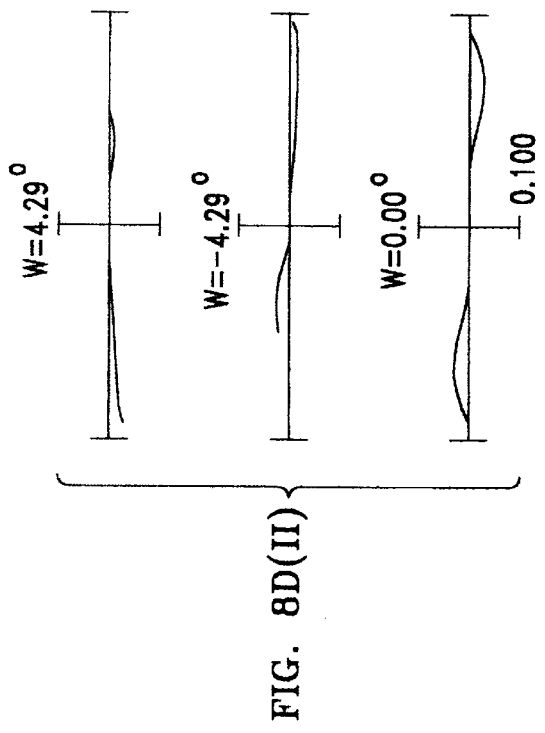
FIGS. 8D(I)–8D(III) are plots of coma at infinite focus and in the maximum wide-angle state, intermediate focal length state and maximum telephoto state, respectively, for Working Example 4 when the antivibration function is engaged.
Figure 8D:
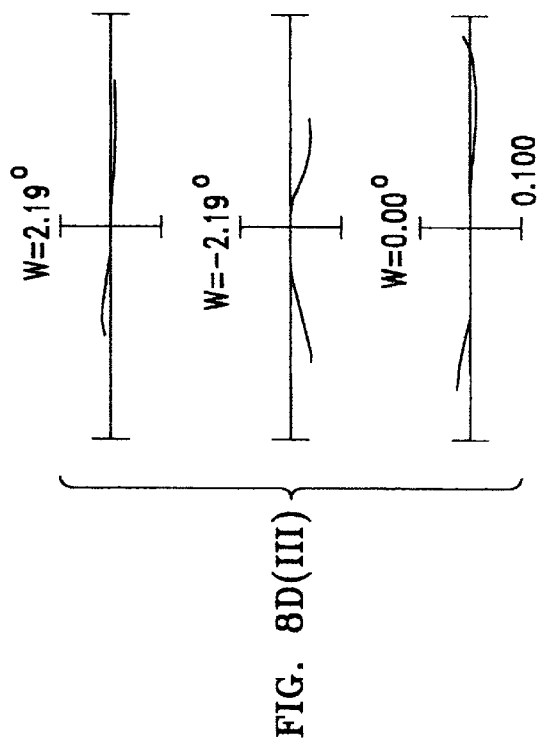
Figure 8D:
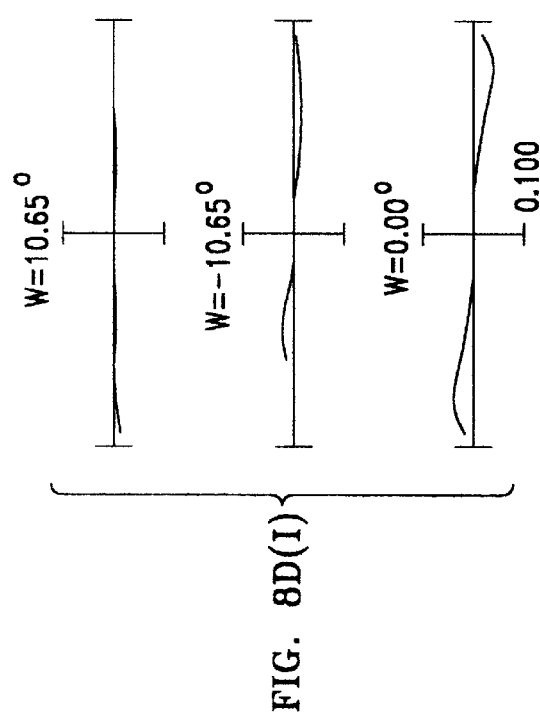

With reference to FIG. 7, antivibration zoom lens 70 comprises similar lens elements as those of zoom lens 10 of Working Example 1, except that lens L41 is a negative meniscus lens whose concave surface faces objectwise and lens L52 is a positive meniscus lens whose convex surface faces objectwise. In addition, sixth lens group G6 comprises, objectwise to imagewise, a cemented lens L61 comprising a biconcave lens L61a and a positive meniscus lens L61b whose convex surface faces objectwise. Likewise, aperture stop AS is arranged between third lens group G3 and fourth lens group G4.

TABLE 4A

DESIGN SPECIFICATIONS
f = 81.976 mm – 390.000 mm
FNO = 4.600 – 5.701
2ω = 30.67° – 6.15°

| S | R | D | Vd | Nd |
|---|---|---|----|----|
| 1 | 126.4683 | 3.7000 | 25.41 | 1.805182 |
| 2 | 79.8195 | 11.0000 | 82.52 | 1.497820 |
| 3 | −919.6837 | 0.2000 | | 1.000000 |
| 4 | 126.4244 | 7.1000 | 70.41 | 1.487490 |
| 5 | −801.5821 | d5 | | 1.000000 |
| 6 | −654.6276 | 3.8000 | 25.41 | 1.805182 |
| 7 | −57.1588 | 1.8000 | 40.90 | 1.796310 |
| 8 | 191.6240 | 3.9836 | | 1.000000 |
| 9 | −89.7904 | 1.7000 | 60.03 | 1.640000 |
| 10 | 33.2136 | 3.5000 | 33.89 | 1.803840 |
| 11 | 78.6220 | 5.2156 | | 1.000000 |
| 12 | −118.7153 | 2.0000 | 45.37 | 1.796681 |
| 13 | 2148.6437 | d13 | | 1.000000 |
| 14 | 68.2852 | 4.2000 | 70.41 | 1.487490 |
| 15 | −176.2925 | 0.2000 | | 1.000000 |
| 16 | 61.4056 | 5.2000 | 82.52 | 1.497820 |
| 17 | −90.2467 | 2.0000 | 49.45 | 1.772789 |
| 18 | −561.3466 | d18 | | 1.000000 |
| 19 | −62.6838 | 2.5000 | 70.41 | 1.487490 |
| 20 | −144.0193 | d20 | | 1.000000 |
| 21 | 147.6454 | 5.1000 | 70.41 | 1.487490 |
| 22 | −30.7496 | 1.5000 | 25.35 | 1.805182 |
| 23 | −53.5466 | 0.2000 | | 1.000000 |
| 24 | 49.6104 | 2.9000 | 70.41 | 1.487490 |
| 25 | 418.8685 | d25 | | 1.000000 |
| 26 | −66.6285 | 1.4000 | 45.37 | 1.796681 |
| 27 | 25.4283 | 4.0000 | 25.35 | 1.805182 |
| 28 | 99.8403 | Bf | | 1.000000 |

TABLE 4B

VARIABLE SPACING WHEN ZOOMING (INFINITE FOCUS)

| f   | 81.976   | 200.000  | 390.000  |
|-----|----------|----------|----------|
| d5  | 3.28216  | 42.32542 | 60.55287 |
| d13 | 29.41049 | 16.32822 | 3.11555  |
| d18 | 4.99631  | 18.07858 | 31.29125 |
| d20 | 36.32903 | 25.55992 | 29.88582 |
| d25 | 27.49313 | 18.06029 | 3.54032  |
| Bf  | 40.97780 | 61.17974 | 71.37383 |

TABLE 4C

EFFECT OF ENGAGING ANTIVIBRATION FUNCTION

| f | 82 mm | 200 mm | 390 mm |
|---|-------|--------|--------|
| Amount of movement of antivibration lens sub-group (mm) | 0.8 | 0.8 | 0.8 |
| Amount of image movement (mm) | −0.717 | −1.152 | −1.704 |

TABLE 4D

VALUES CORRESPONDING TO DESIGN CONDITIONS

| | |
|---|---|
| Na | 1.803840 |
| Nb | 1.640000 |
| R1 | −89.790 |
| R2 | 78.622 |
| fW | 81.976 |
| fT | 390.000 |
| f1 | 135.328 |
| f2 | −37.998 |
| f2B | −79.995 |
| $FNO_T$ | 5.701 |
| (1) $|f2B|/|f2|$ | 2.105 |
| (2) $|Na - Nb|$ | 0.163840 |
| (3) $(R2 + R1)/(R2 - R1)$ | −0.066 |
| (4) $FNO_T \cdot f1/fT$ | 1.978 |
| (5) $|f2|/fW$ | 0.464 |

FIGS. 8A–8D are aberration plots with respect to the d-line (λ=587.6 nm) for Working Example 4. From these aberration plots, it can be seen that, for every case in Working Example 4 including every focal length state, the various aberrations are satisfactorily corrected and superior imaging performance is obtained even when the antivibration function is engaged.

Working Example 5

Figure 9:
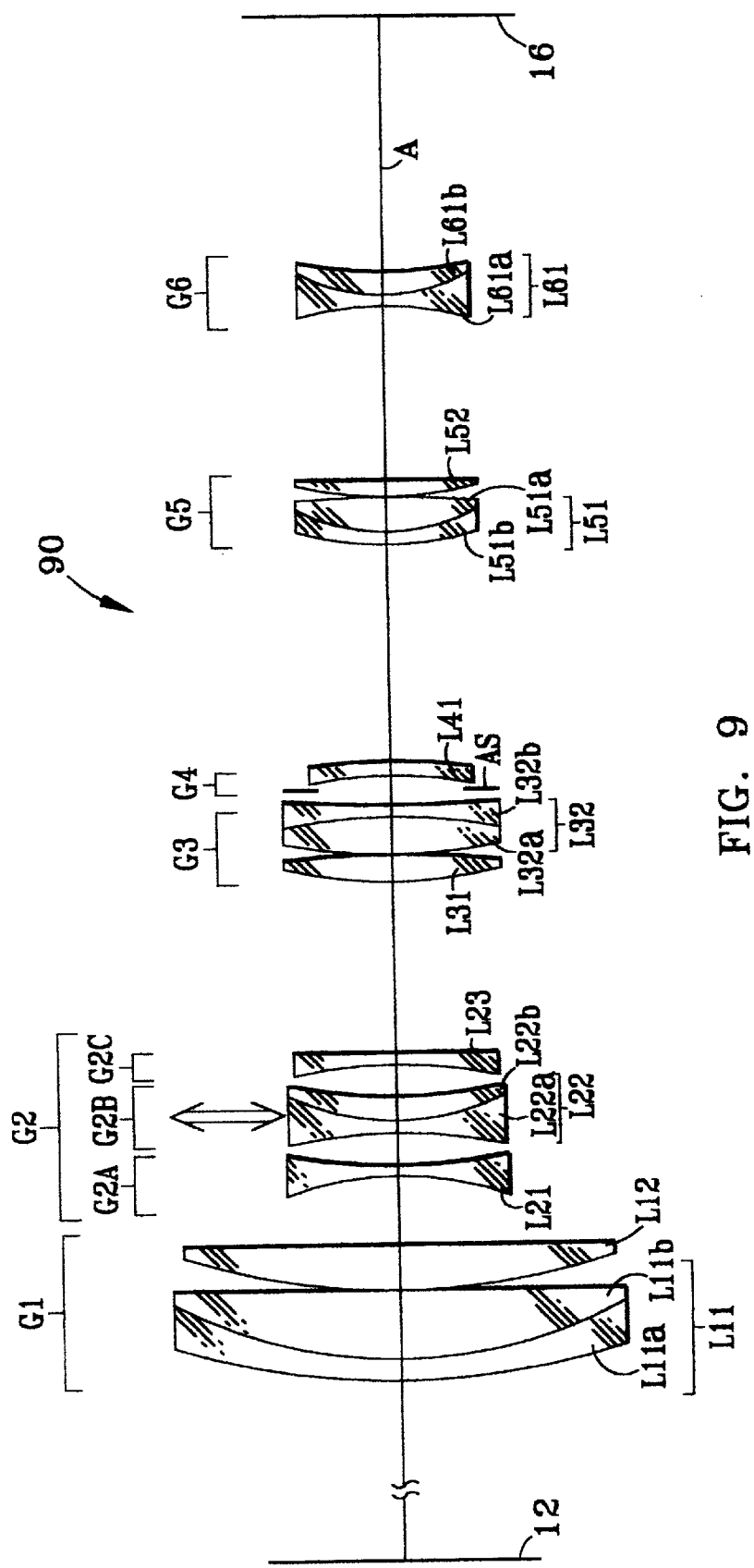
FIG. 9 is a schematic optical diagram of the zoom lens of the present invention according to Working Example 5.
Figure 10D:
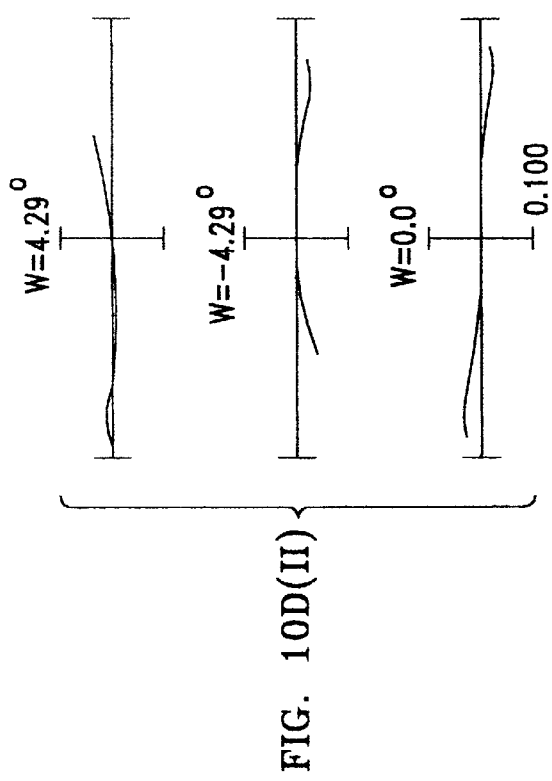
FIGS. 10D(I)–10D(III) are plots of coma at infinite focus and in the maximum wide-angle state, intermediate focal length state and maximum telephoto state, respectively, for Working Example 5 when the antivibration function is engaged.
Figure 10D:
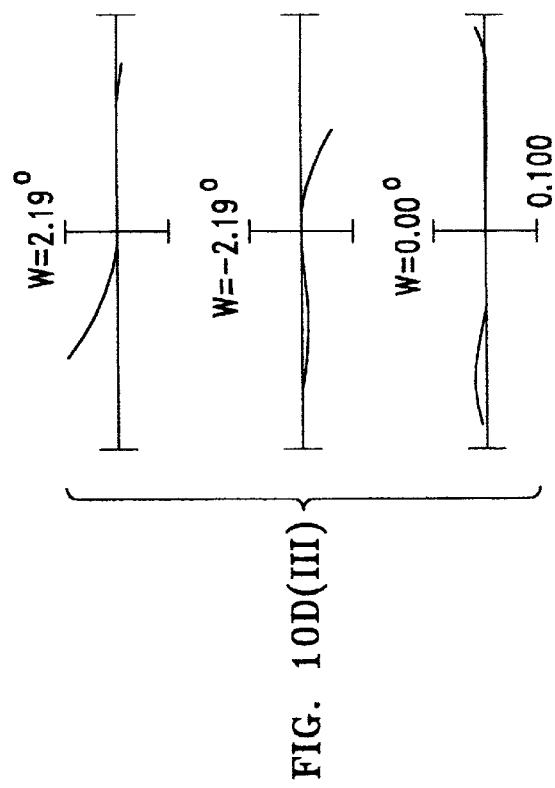
Figure 10D:
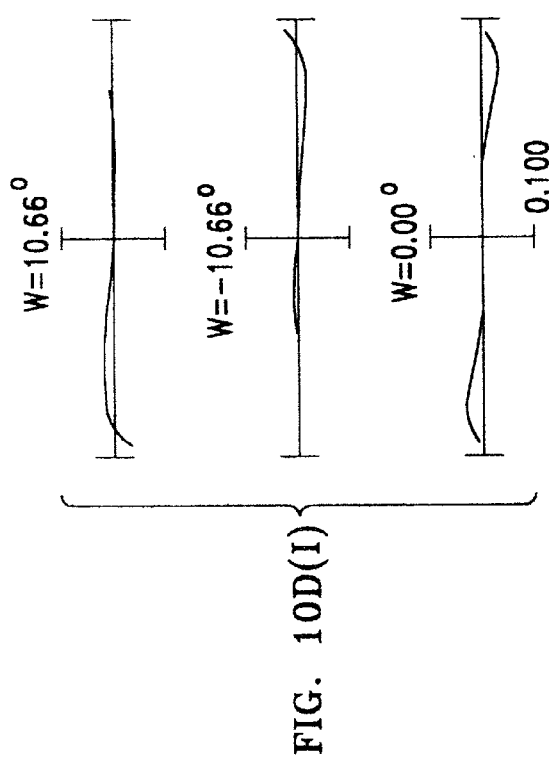

With reference to FIG. 9, and antivibration zoom lens 90 comprises similar lens elements as those of zoom lens 10 of Working Example 1, except that second lens sub-group G2A comprises a biconcave lens L21, fourth lens group G4 comprises one negative meniscus lens L41 whose concave surface faces objectwise, and fifth lens group G5 comprises, objectwise to imagewise, a cemented lens L51 comprising a negative meniscus lens L51*b* whose convex surface faces objectwise and a biconvex lens L51*a*, and a positive meniscus lens L52 whose convex surface faces objectwise. Likewise, aperture stop AS is arranged between third lens group G3 and fourth lens group G4.

TABLE 5A

DESIGN SPECIFICATIONS
f = 82.000 mm − 390.000 mm
FNO = 4.601 − 5.718
2ω = 30.73° − 6.14°

| S | R | D | Vd | Nd |
|---|-----------|--------|-------|----------|
| 1 | 115.3536  | 3.6000 | 25.41 | 1.805182 |
| 2 | 77.5348   | 11.5000| 82.52 | 1.497820 |
| 3 | −649.6334 | 0.2000 |       | 1.000000 |
| 4 | 139.0226  | 5.7000 | 82.52 | 1.497820 |
| 5 | −3395.8712| d5     |       | 1.000000 |
| 6 | −235.9202 | 1.5000 | 60.03 | 1.640000 |
| 7 | 150.2688  | 4.5405 |       | 1.000000 |
| 8 | −106.9616 | 1.5000 | 60.03 | 1.640000 |
| 9 | 39.8871   | 4.0000 | 25.41 | 1.805182 |
| 10| 105.5047  | 5.9488 |       | 1.000000 |
| 11| −88.6768  | 1.5000 | 60.03 | 1.640000 |
| 12| 1433.0844 | d12    |       | 1.000000 |
| 13| 66.3747   | 4.5000 | 64.10 | 1.516800 |
| 14| −243.4845 | 0.2000 |       | 1.000000 |
| 15| 78.0076   | 5.1000 | 64.10 | 1.516800 |
| 16| −134.8971 | 1.7000 | 33.89 | 1.803840 |
| 17| −921.5024 | d17    |       | 1.000000 |
| 18| −41.7773  | 2.5000 | 64.10 | 1.516800 |
| 19| −55.4641  | d19    |       | 1.000000 |
| 20| 80.3432   | 1.5000 | 25.41 | 1.805182 |
| 21| 34.4733   | 4.9000 | 64.10 | 1.516800 |
| 22| −171.7238 | 0.2000 |       | 1.000000 |
| 23| 43.3358   | 2.8000 | 64.10 | 1.516800 |
| 24| 1575.7021 | d24    |       | 1.000000 |
| 25| −72.9581  | 1.5000 | 45.37 | 1.796681 |
| 26| 24.4201   | 3.8000 | 25.41 | 1.805182 |
| 27| 88.3466   | Bf     |       | 1.000000 |

TABLE 5B

VARIABLE SPACING WHEN ZOOMING (INFINITE FOCUS)

| f   | 82.000   | 200.000  | 390.000  |
|-----|----------|----------|----------|
| d5  | 3.81635  | 43.90264 | 62.91385 |
| d12 | 29.71300 | 15.75413 | 3.13367  |
| d17 | 9.09357  | 23.05245 | 35.67291 |
| d19 | 32.78273 | 22.30105 | 28.96372 |
| d24 | 26.87093 | 18.00315 | 2.57985  |
| Bf  | 41.18280 | 60.53225 | 69.29282 |

TABLE 5C

EFFECT OF ENGAGING ANTIVIBRATION FUNCTION

| f | 82 mm | 200 mm | 390 mm |
|---|-------|--------|--------|
| Amount of movement of antivibration lens sub-group (mm) | 0.8 | 0.8 | 0.8 |
| Amount of image movement (mm) | −0.559 | −0.889 | −1.296 |

TABLE 5D

VALUES CORRESPONDING TO DESIGN CONDITIONS

| | |
|---|---|
| Na | 1.805182 |
| Nb | 1.640000 |
| R1 | −106.962 |
| R2 | 105.505 |
| fW | 82.000 |
| fT | 390.000 |
| f1 | 135.327 |
| f2 | −38.574 |
| f2B | −105.000 |

TABLE 5D-continued

VALUES CORRESPONDING TO DESIGN CONDITIONS

| | |
|---|---|
| $FNO_T$ | 5.718 |
| (1) $\|f2B\|/\|f2\|$ | 2.722 |
| (2) $\|Na - Nb\|$ | 0.165182 |
| (3) $(R2 + R1)/(R2 - R1)$ | -0.007 |
| (4) $FNO_T \cdot f1/fT$ | 1.984 |
| (5) $\|f2\|/fW$ | 0.470 |

FIGS. 10A–10D are aberration plots with respect to the d-line (λ=587.6 nm) for Working Example 5. From these aberration plots, it can be seen that, for every case in Working Example 5 including every focal length state, the various aberrations are satisfactorily corrected and superior imaging performance is obtained even when the antivibration function is engaged.

In the antivibration zoom lenses according to each of the Working Examples set forth above, first lens group G1 is moved axially to perform focusing of an object focusing from an infinite distance to close range. However, at least one of the lens groups among second lens group G2 to sixth lens group G6 may also be moved axially for focusing.

As explained above, the present invention is a high-performance compact zoom lens having an antivibration function. While the present invention has been described in connection with preferred embodiments and Working Examples, it will be understood that it is not so limited. On the contrary, it is intended to cover all alternatives, modifications and equivalents as may be included within the spirit and scope of the invention as defined in the appended claims.

What is claimed is:

1. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups each having negative refractive power, and wherein one of said at least three lens sub-groups is movable substantially perpendicularly to the optical axis, said antivibration lens group including a cemented lens comprising a positive lens and a negative lens;

c) at least third and fourth lens groups, wherein all said lens groups are separated by respective spacings which change when zooming from the maximum wide-angle state to the maximum telephoto state; and d) wherein the following conditions are satisfied:

$$1.0<|f2B|/|f2|<3.7$$

where f2B is a focal length of said one of said at least three lens sub-groups and f2 is a focal length of said second lens group;

$$0.1<|Na-Nb|$$

where an Na is an index of refraction of said positive lens of said cemented lens with respect to d-line wavelength light and Nb is an index of refraction of said negative lens of said cemented lens with respect to d-line wavelength light;

$$-0.5<(R2+R1)/(R2-R1)<0.5$$

where R1 is a radius of curvature of a most objectwise lens surface of said antivibration lens group and R2 is a radius of curvature of a most imagewise lens surface of said antivibration lens group;

$$1.5<FNO_T \cdot f1/fT<3.0$$

where fT is an overall focal length of the zoom lens in said maximum telephoto state, $FNO_T$ is an F-number of the zoom lens in said maximum telephoto state, and f1 is a focal length of said first lens group; and $$0.3<|f2|/fW<0.7$$

where fW is an overall focal length of the zoom lens in said maximum wide-angle state.

2. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups each having negative refractive power, and wherein one of said at least three lens sub-groups is movable substantially perpendicularly to the optical axis, said antivibration lens group including a cemented lens comprising a positive lens and a negative lens;

c) at least third and fourth lens groups, wherein all said lens groups are separated by respective spacings which change when zooming from the maximum wide-angle state to the maximum telephoto state; and d) wherein the following conditions are satisfied:

$$1.0<|f2B|/|f2|<3.7$$

where f2B is a focal length of said one of said at least three lens sub-groups and f2 is a focal length of said second lens group;

$$0.1<|Na-Nb|$$

where an Na is an index of refraction of said positive lens of said cemented lens with respect to d-line wavelength light and Nb is an index of refraction of said negative lens of said cemented lens with respect to d-line wavelength light;

$$-0.5<(R2+R1)/(R2-R1)<0.5$$

where R1 is a radius of curvature of a most objectwise lens surface of said antivibration lens group and R2 is a radius of curvature of a most imagewise lens surface of said antivibration lens group; and $$0.3<|f2|/fW<0.7$$

where fW is an overall focal length of the zoom lens in said maximum wide-angle state.

3. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups, and wherein one of said at least three lens sub-groups is movable substantially perpendicularly to the optical axis, said antivibration lens group including a cemented lens comprising a positive lens and a negative lens;

c) at least third and fourth lens groups, wherein all said lens groups are separated by respective spacings which change when zooming from the maximum wide-angle state to the maximum telephoto state; and d) wherein the following conditions are satisfied:

$$1.0 < |f2B|/|f2| < 3.7$$

where f2B is a focal length of said one of said at least three lens sub-groups and f2 is a focal length of said second lens group;

$$0.1 < |Na - Nb|$$

where an Na is an index of refraction of said positive lens of said cemented lens with respect to d-line wavelength light and Nb is an index of refraction of said negative lens of said cemented lens with respect to d-line wavelength light;

$$-0.5 < (R2+R1)/(R2-R1) < 0.5$$

where R1 is a radius of curvature of a most objectwise lens surface of said antivibration lens group and R2 is a radius of curvature of a most imagewise lens surface of said antivibration lens group;

$$1.5 < FNO_T \cdot f1/fT < 3.0$$

where fT is an overall focal length of the zoom lens in said maximum telephoto state, $FNO_T$ is an F-number of the zoom lens in said maximum telephoto state, and f1 is a focal length of said first lens group; and $$0.3 < |f2|/fW < 0.7$$

where fW is an overall focal length of the zoom lens in said maximum wide-angle state.

4. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups, and wherein one of said at least three lens sub-groups is movable substantially perpendicularly to the optical axis, said antivibration lens group including a cemented lens comprising a positive lens and a negative lens;

c) at least third and fourth lens groups, wherein all said lens groups are separated by respective spacings which change when zooming from the maximum wide-angle state to the maximum telephoto state; and d) wherein the following conditions are satisfied:

$$1.0 < |f2B|/|f2| < 3.7$$

where f2B is a focal length of said one of said at least three lens sub-groups and f2 is a focal length of said second lens group;

$$0.1 < |Na - Nb|$$

where an Na is an index of refraction of said positive lens of said cemented lens with respect to d-line wavelength light and Nb is an index of refraction of said negative lens of said cemented lens with respect to d-line wavelength light;

$$-0.5 < (R2+R1)/(R2-R1) < 0.5$$

where R1 is a radius of curvature of a most objectwise lens surface of said antivibration lens group and R2 is a radius of curvature of a most imagewise lens surface of said antivibration lens group; and $$0.3 < |f2|/fW < 0.7$$

where fW is an overall focal length of the zoom lens in said maximum wide-angle state.

5. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups, and wherein one of said at least three lens sub-groups is movable substantially perpendicularly to the optical axis;

c) at least third and fourth lens groups, wherein all said lens groups are separated by respective spacings which change when zooming from the maximum wide-angle state to the maximum telephoto state; and d) wherein the following conditions are satisfied:

$$1.0 < |f2B|/|f2| < 3.7$$

where f2B is a focal length of said one of said at least three lens sub-groups and f2 is a focal length of said second lens group;

$$-0.5 < (R2+R1)/(R2-R1) < 0.5$$

where R1 is a radius of curvature of a most objectwise lens surface of said antivibration lens group and R2 is a radius of curvature of a most imagewise lens surface of said antivibration lens group;

$$1.5 < FNO_T \cdot f1/fT < 3.0$$

where fT is an overall focal length of the zoom lens in said maximum telephoto state, $FNO_T$ is an F-number of the zoom lens in said maximum telephoto state, and f1 is a focal length of said first lens group; and $$0.3<|f2|/fW<0.7$$

where fW is an overall focal length of the zoom lens in said maximum wide-angle state.

6. A zoom lens having an antivibration function and capable of forming an image of an object over a zooming range from a maximum wide-angle state to a maximum telephoto state, comprising, objectwise to imagewise along an optical axis:

a) a first lens group having positive refractive power;

b) a second lens group, serving as an antivibration lens group, having negative refractive power and comprising at least three lens sub-groups, and wherein one of said at least three lens sub-groups is movable substantially perpendicularly to the optical axis;

c) at least third and fourth lens groups, wherein all said lens groups are separated by respective spacings which change when zooming from the maximum wide-angle state to the maximum telephoto state; and d) wherein the following conditions are satisfied:

$$1.0<|f2B|/|f2|<3.7$$

where f2B is a focal length of said one of said at least three lens sub-groups and f2 is a focal length of said second lens group;

$$1.5<FNO_T \cdot f1/fT<3.0$$

where fT is an overall focal length of the zoom lens in said maximum telephoto state, $FNO_T$ is an F-number of the zoom lens in said maximum telephoto state, and f1 is a focal length of said first lens group; and $$0.3<|f2|/fW<0.7$$

where fW is an overall focal length of the zoom lens in said maximum wide-angle state.

* * * * *